(12) United States Patent
Aizawa

(10) Patent No.: US 10,155,427 B2
(45) Date of Patent: Dec. 18, 2018

(54) AIR CONDITIONER

(71) Applicant: DENSO CORPORATION, Kariya, Aichi-pref. (JP)

(72) Inventor: Hideo Aizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 38 days.

(21) Appl. No.: 15/522,219

(22) PCT Filed: Nov. 17, 2015

(86) PCT No.: PCT/JP2015/005709
§ 371 (c)(1),
(2) Date: Apr. 26, 2017

(87) PCT Pub. No.: WO2016/084332
PCT Pub. Date: Jun. 2, 2016

(65) Prior Publication Data
US 2017/0320372 A1    Nov. 9, 2017

(30) Foreign Application Priority Data

Nov. 27, 2014   (JP) .................................. 2014-240159
Sep. 28, 2015   (JP) .................................. 2015-190125

(51) Int. Cl.
*B60H 1/00* (2006.01)

(52) U.S. Cl.
CPC ..... *B60H 1/00592* (2013.01); *B60H 1/00521* (2013.01); *B60H 1/00585* (2013.01);
(Continued)

(58) Field of Classification Search
CPC .............. B60H 1/00592; B60H 1/3205; B60H 1/00685; B60H 1/00585; B60H 1/00864;
(Continued)

(56) References Cited

U.S. PATENT DOCUMENTS 5,062,352 A  * 11/1991 Ostrand ............. B60H 1/00057
165/42
5,399,120 A  * 3/1995 Burns ................ B60H 1/00685
454/121

(Continued)

FOREIGN PATENT DOCUMENTS

EP        2476599 A1    7/2012
JP     2008089238 A    4/2008
(Continued)

*Primary Examiner* — Emmanuel Duke
(74) *Attorney, Agent, or Firm* — Harness, Dickey & Pierce, P.L.C.

(57) ABSTRACT

In a rotary door of a vehicular air conditioner, an outer peripheral portion closes a defroster blowing opening and another outer peripheral portion closes a foot blowing opening in a face mode. A first door opening communicates with an inlet opening and a second door opening communicates with a face blowing opening. A cross-sectional area of a flow path through which the airflow passes through the inlet opening and the first door opening is equal to a cross-sectional area of a flow path through which the airflow passes through the face blowing opening and the second door opening.

11 Claims, 23 Drawing Sheets

(52) U.S. Cl.
CPC ..... *B60H 1/00685* (2013.01); *B60H 1/00864* (2013.01); *B60H 2001/006* (2013.01)

(58) Field of Classification Search
CPC .. B60H 1/00521; B60H 1/00; B60H 1/00849; B60H 1/00678
See application file for complete search history.

(56) References Cited

U.S. PATENT DOCUMENTS

| | | | | |
|---|---|---|---|---|
| 7,241,216 | B2 * | 7/2007 | Kamsma | B60H 1/00542 454/126 |
| 8,661,844 | B2 * | 3/2014 | Klinkhammer | B60H 1/00685 62/404 |
| 2009/0025904 | A1 * | 1/2009 | Tokunaga | B60H 1/00028 165/58 |

FOREIGN PATENT DOCUMENTS

| | | |
|---|---|---|
| JP | 2012144167 A | 8/2012 |
| JP | 2013023120 A | 2/2013 |
| JP | 2013133069 A | 7/2013 |

* cited by examiner

VEHICULAR WIDTH DIRECTION

|  | FACE MODE | B/L MODE | FOOT MODE | F/D MODE | DEF MODE |
|---|---|---|---|---|---|
| BLOWER Lo |  |  |  |  |  |
| BLOWER Mi |  |  |  |  |  |
| ⋮ |  |  |  |  |  |
| BLOWER Hi (AUTO) |  |  |  |  | NOISE NG |
| BLOWER Hi (MANUAL) | NOISE NG |  | NOISE NG |  | NOISE NG |

__US 10,155,427 B2__

AIR CONDITIONER

CROSS REFERENCE TO RELATED APPLICATIONS

This application is a U.S. National Phase Application under 35 U.S.C. 371 of International Application No. PCT/JP2015/005709 filed on Nov. 17, 2015 and published in Japanese as WO 2016/084332 A1 on Jun. 2, 2016. This application is based on and claims the benefit of priority from Japanese Patent Applications No. 2014-240159 filed on Nov. 27, 2014, and No. 2015-190125 filed on Sep. 28, 2015. The entire disclosures of all of the above applications are incorporated herein by reference.

TECHNICAL FIELD

The present disclosure relates to an air conditioner provided with a rotary door.

BACKGROUND ART

Conventionally, a vehicular air conditioner includes a cooling heat exchanger or the like installed in an air conditioning case to regulate a temperature of air blown from an air blower, and a rotary door to switch blow modes in which temperature-regulated air is blown into a compartment (see, for example, Patent Document 1).

The rotary door is stored in the air conditioning case, and includes first and second outer peripheral portions which extend in a circumferential direction centered at a rotation shaft while being arranged side by side in the circumferential direction at an interval. First and second door openings are provided in respective spaces between the first and second outer peripheral portions. The rotary door is configured in such a manner that the first and second outer peripheral portions and the first and second door openings rotate with a rotation of the rotation shaft.

Multiple blowing openings are provided to the air conditioning case along an outer periphery of the rotary door about the rotation shaft. The multiple blowing openings include a defroster blowing opening, a foot blowing opening, and a face blowing opening.

When one of the first and second door openings communicates with one of the multiple blowing openings, an airflow flowing from another of the first and second door openings is blown into a compartment through the one door opening and the one blowing opening communicating with each other.

Accordingly, when the rotary door rotates, the blowing opening which communicates with the door opening is switched. That is, the blowing opening from which an airflow is blown into the compartment switches from one to another among the multiple blowing openings. Accordingly, the blow modes can be switched. By using the rotary door configured as above, a physical size of the air conditioning case and a pressure loss of an airflow can be reduced in comparison with a case where doors are provided to the respective blowing openings.

The vehicular air conditioner of Patent Document 1 using the rotary door to switch the blow modes in the manner described above is capable of reducing a physical size of the air conditioning case and a pressure loss of an airflow. Hence, a level of noise generated when an airflow passes through the air conditioning case can be lowered over a broad range of frequency.

In practice, however, noise at a predetermined frequency, such as wind noise generated when an air flow passes through the cooling heat exchanger and noise generated at the air blower, propagates to the compartment without being attenuated in the air conditioning case in some cases. In other words, a noise level can be lowered over a broad range of frequency by the rotary door whereas noise at a predetermined frequency may possibly become obvious in comparison with noise at other frequencies, in which case noise at the predetermined frequency may give an occupant in the compartment a feeling of strangeness.

PRIOR ART DOCUMENT

Patent Document
Patent Document 1: JP 2013-023120 A

SUMMARY

In view of the foregoing points, an object of the present disclosure is to provide an air conditioner capable of lowering a noise level.

According to a first aspect of the present disclosure, an air conditioner includes an air blower generating an airflow, a rotary door, an air conditioner case, a door space, a first controller, a second controller, an adjusting door, a detector and a third controller. The rotary door includes: a plurality of outer peripheral portions extending in a circumferential direction centered at a shaft center of a rotation shaft which is rotatable, and being arranged side by side in the circumferential direction; first and second side walls disposed, respectively, on a first side and a second side of the plurality of outer peripheral portions in an axial direction of the rotation shaft; and a plurality of door openings provided between the plurality of outer peripheral portions. The plurality of outer peripheral portions, the first and second side walls, and the plurality of door openings rotate simultaneously in accordance with rotation of the rotation shaft. The air conditioner case stores the rotary door and includes an air flow path where the airflow flows, and a case peripheral wall portion. The case peripheral wall portion includes an inlet opening communicating with the air flow path, and a plurality of blowing openings communicating with a compartment. The inlet opening and the plurality of blowing openings are located on an outer side of the rotary door in a radial direction centered at the shaft center. The door space is provided inside the rotary door in the air conditioner case and surrounded by the plurality of outer peripheral portions, the first and second side walls, and the case peripheral wall portion. When a first door opening of the plurality of door openings communicates with the inlet opening, and when a second door opening of the plurality of door openings communicates with a first blowing opening of the plurality of blowing openings, an airflow from the air flow path is blown into the compartment through the inlet opening, the first door opening, the door space, the second door opening, and the first blowing opening. The first controller controls the rotary door to allow the second door opening to communicate with the first blowing opening. The second controller controls the air blower to blow a predetermined volume of blowing air. The adjusting door adjusts at least one of a first area and a second area. The first area is defined as a cross-sectional area of a flow path through which the airflow passes from the inlet opening to the first door opening, and the second area is defined as a cross-sectional area of a flow path through which the airflow passes from the second door opening to the first blowing opening. The detector detects a level of noise generated when the first controller controls the rotary door and when the second controller controls the air blower. The third controller controls the adjusting door to reduce a difference between the first area and the second area when a detection value of the detector is determined to be equal or larger than a predetermined value.

Owing to the configuration as above, a noise level can be lowered by controlling the adjusting door to reduce a difference between the first area and the second area when the noise level is at or above the predetermined value.

According to a second aspect of the present disclosure, an air conditioner includes an air blower generating an airflow, a rotary door, an air conditioner case, a door space, a first decider, a second decider, a first controller, a second controller, a determiner, an adjusting door and a third controller. The rotary door includes: a plurality of outer peripheral portions extending in a circumferential direction centered at a shaft center of a rotation shaft which is rotatable, and being arranged side by side in the circumferential direction; first and second side walls disposed, respectively, on a first side and a second side of the plurality of outer peripheral portions in an axial direction of the rotation shaft; and a plurality of door openings provided between the plurality of outer peripheral portions. The plurality of outer peripheral portions, the first and second side walls, and the plurality of door openings rotate simultaneously in accordance with rotation of the rotation shaft. The air conditioner case stores the rotary door and includes an air flow path where the airflow flows, and a case peripheral wall portion. The case peripheral wall portion includes an inlet opening communicating with the air flow path, and a plurality of blowing openings communicating with a compartment. The inlet opening and the plurality of blowing openings are located on an outer side of the rotary door in a radial direction centered at the shaft center. The door space is provided inside the rotary door in the air conditioner case and surrounded by the plurality of outer peripheral portions, the first and second side walls, and the case peripheral wall portion. When a first door opening of the plurality of door openings communicates with the inlet opening, and when a second door opening of the plurality of door openings communicates with a first blowing opening of the plurality of blowing openings, an airflow from the air flow path is blown into the compartment through the inlet opening, the first door opening, the door space, the second door opening, and the first blowing opening. The first decider decides one of the plurality of blowing openings as the first blowing opening from which the airflow is blown out. The second decider decides a volume of blowing air to be generated by the air blower. The first controller controls the rotary door to allow the second door opening to communicate with the first blowing opening decided by the first decider. The second controller controls the air blower to blow the volume of blowing air decided by the second decider. The determiner determines whether a noise level estimated according to the volume of blowing air decided by the second decider and the first blowing opening decided by the first decider is at or above a predetermined value, before the controls are performed by the first controller and the second controller. The adjusting door adjusts at least one of a first area and a second area. The first area is defined as a cross-sectional area of a flow path through which the airflow passes from the inlet opening to the first door opening, and the second area is defined as a cross-sectional area of a flow path through which the airflow passes from the second door opening to the first blowing opening. The third controller controls the adjusting door to reduce a difference between the first area and the second area at the time of the controls performed by the first controller and the second controller, when the determiner determines that the noise level estimated is at or above the predetermined value.

Owing to the configuration as above, a noise level can be lowered by controlling the adjusting door to reduce a difference between the first area and the second area when controls by the first controller and the second controller are performed.

According to a third aspect of the present disclosure, an air conditioner includes a rotary door, an air conditioner case and a door space. The rotary door includes: a plurality of outer peripheral portions extending in a circumferential direction centered at a shaft center of a rotation shaft which is rotatable, and being arranged side by side in the circumferential direction; first and second side walls disposed, respectively, on a first side and a second side of the plurality of outer peripheral portions in an axial direction of the rotation shaft; and a plurality of door openings provided between the plurality of outer peripheral portions. The plurality of outer peripheral portions, the first and second side walls, and the plurality of door openings rotate simultaneously in accordance with rotation of the rotation shaft. The air conditioner case stores the rotary door and includes an air flow path where an airflow flows, and a case peripheral wall portion. The case peripheral wall portion includes an inlet opening communicating with the air flow path, and a plurality of blowing openings communicating with a compartment. The inlet opening and the plurality of blowing openings are located on an outer side of the rotary door in a radial direction centered at the shaft center. The door space is provided inside the rotary door in the air conditioner case and surrounded by the plurality of outer peripheral portions, the first and second side walls, and the case peripheral wall portion. When a first door opening of the plurality of door openings communicates with the inlet opening, and when a second door opening of the plurality of door openings communicates with a first blowing opening of the plurality of blowing openings, an airflow from the air flow path is blown into the compartment through the inlet opening, the first door opening, the door space, the second door opening, and the first blowing opening. A cross-sectional area of a flow path through which the airflow passes from the inlet opening to the first door opening is defined as a first area, and a cross-sectional area of a flow path through which the airflow passes from the second opening to the first blowing opening is defined as a second area. The first area and the second area are equal to each other.

Owing to the configuration as above, because the first area and the second area are equal to each other, air expands in the door space when an airflow flows into the door space from the inlet opening and pulsation of the airflow can be reduced. Hence, an air conditioner capable of lowering a noise level by using the rotary door can be provided.

The term, "a cross-sectional area of a flow path", referred to herein means an area of a flow path in cross section orthogonal to an air flowing direction in an air flow path where an airflow flows. For example, the first area is an area of a flow path in cross section orthogonal to an air flowing direction in an air flow path formed when an airflow passes through the inlet opening and the first door opening. The second area is an area of a flow path in cross section orthogonal to an air flowing direction in an air flow path formed when an airflow passes through the second door opening and the first blowing opening.

DESCRIPTION OF EMBODIMENTS

Figure 1:
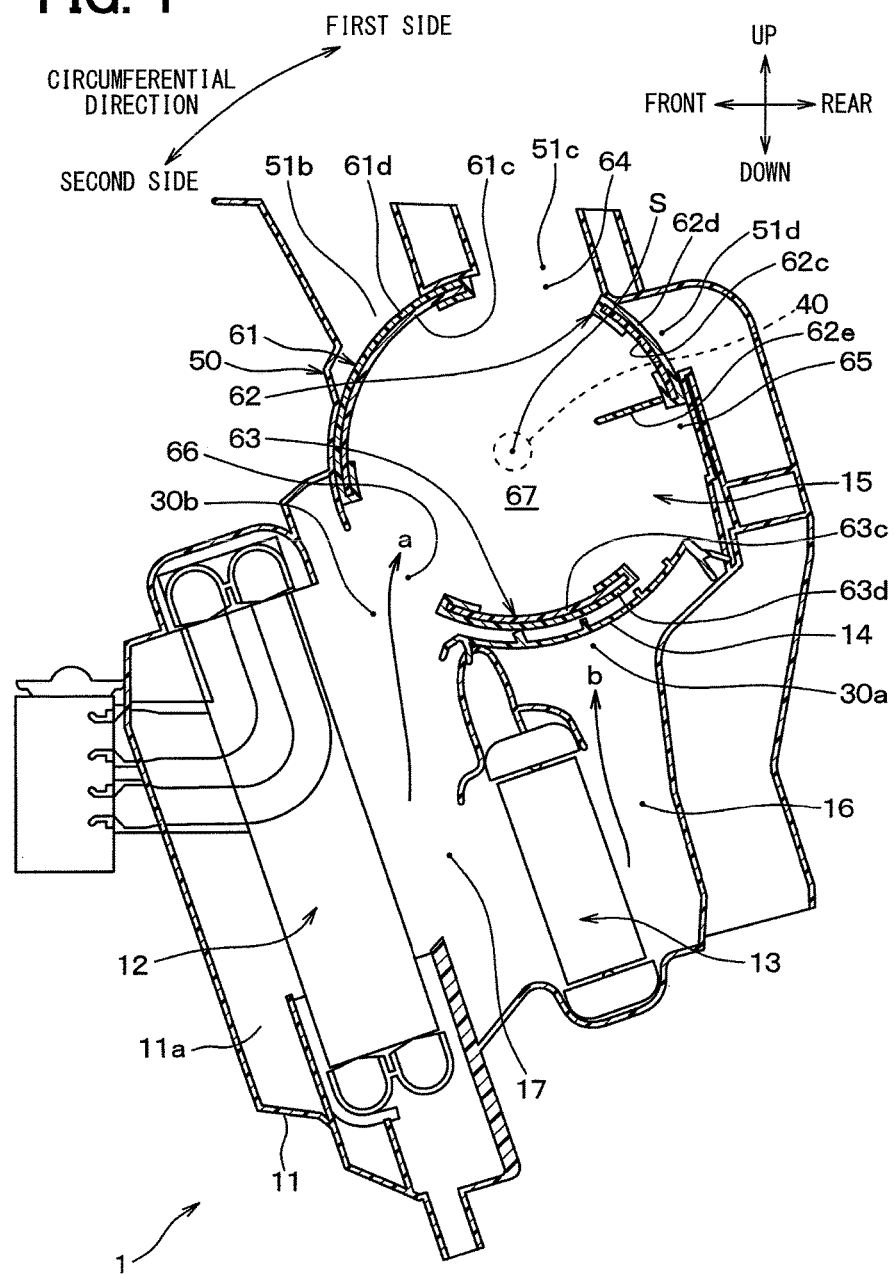
FIG. 1 is a cross section of a vehicular air conditioner according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

FIG. 1 is a view showing a schematic configuration of a vehicular air conditioner 1. In FIG. 1, respective arrows pointing upward, downward, frontward, and rearward specify directions when the vehicular air conditioner 1 is installed to a vehicle. The upward arrow specifies an upper side in a vertical direction, the downward arrow specifies a lower side in the vertical direction, the frontward arrow specifies a front side in a vehicle moving direction, and the rearward arrow specifies a rear side in the vehicle moving direction.

Figure 2:
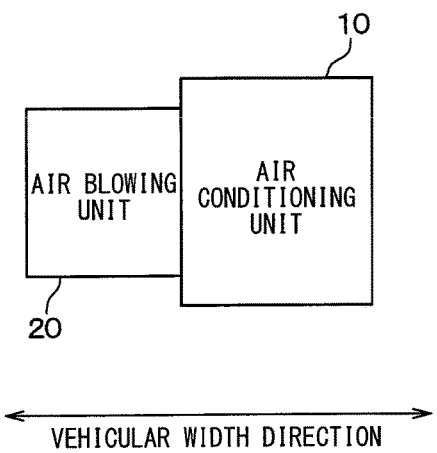
FIG. 2 is a view showing arrangements of an air conditioning unit and an air blowing unit of the first embodiment.

The vehicular air conditioner 1 includes an air conditioning unit 10. The air conditioning unit 10 includes a case 11 (air conditioning case), a cooling heat exchanger 12, a heating heat exchanger 13, an air mixing door 14, and a rotary door 15. An air introduction port 11a is provided to the front side of the case 11 in the vehicle moving direction. The air introduction port 11a opens at one side of the case in a vehicular width direction. Air blown from an air blowing unit (air blower) 20 (see FIG. 2) is introduced to the air introduction port 11a. The air blowing unit 20 is provided on one side of the air conditioning unit 10 in the vehicular width direction (i.e. on a front passenger's seat side).

The cooling heat exchanger 12 is installed on the rear side of the air introduction port 11a of the case 11 in the vehicle moving direction. The cooling heat exchanger 12 together with a compressor, a condenser, and an expansion valve forms a known refrigeration cycle device in which a refrigerant circulates, and cools air introduced into the air introduction port 11a by letting the refrigerant evaporate.

The heating heat exchanger 13 is disposed on the rear side of the cooling heat exchanger 12 in the vehicle moving direction in the case 11, and heats cold air blown out from the cooling heat exchanger 12 with an engine coolant (hot water). A hot air passage 16 is formed on the rear side of the heating heat exchanger 13 in the vehicle moving direction within the case 11 and introduces hot air blown out from the heating heat exchanger 13 toward an inlet opening 30a of the rotary door 15.

A cold air bypass passage 17 is formed between the cooling heat exchanger 12 and the heating heat exchanger 13 within the case 11. The cold air bypass passage 17 is a passage through which cold air from the cooling heat exchanger 12 is introduced toward an inlet opening 30b of the rotary door 15 by bypassing the heating heat exchanger 13. The inlet opening 30a and 30b are located on the upper side of the heating heat exchanger 13 in the vertical direction.

The air mixing door 14 is provided near the inlet openings 30a and 30b above the heating heat exchanger 13. The air mixing door 14 is supported on a rotation shaft 40 (indicated by a chain line of FIG. 1) in a rotatable manner about the rotation shaft 40. The air mixing door 14 is formed in an arc shape about the rotation shaft 40 in cross section. FIG. 1 shows the rotation shaft 40 when seen through from inside the rotary door 15.

The air mixing door 14 changes a ratio of an opening area of the cold air bypass passage 17 and an opening area of the hot air passage 16 according to its own position. The air mixing door 14 thus changes a ratio of an opening area of the inlet opening 30a and an opening area of the inlet opening 30b. Hence, the air mixing door 14 is capable of adjusting a temperature of air to be blown into the compartment by adjusting a ratio of a volume of air flowing through the cold air bypass passage 17 as is indicated by an arrow a and a volume of air flowing through the hot air passage 16 as is indicated by an arrow b.

The air mixing door 14 is driven by an electric motor or manually. FIG. 1 shows the air mixing door 14 in a maximum cool state fully closing the hot air passage 16 and fully opening the cold air bypass passage 17.

The rotary door 15 forms a mode switching door which switches blow modes and is disposed on the upper side of the heating heat exchanger 13 in the vertical direction within the case 11. The rotary door 15 is supported on the rotation shaft 40 in a rotatable manner with respect to the case 11. The rotary door 15 is driven, for example, by an electric motor or manually.

A case peripheral wall portion 50 is provided on an outer side of the rotary door 15 in a direction of a radius within the case 11. The case peripheral wall portion 50 is formed in an arc shape about the rotation shaft 40 in cross section. The case peripheral wall portion 50 is provided with a defroster blowing opening 51b, a face blowing opening 51c, and a foot blowing opening 51d. The defroster blowing opening 51b, the face blowing opening 51c and the foot blowing opening 51d are hereinafter referred to collectively as the blowing openings 51b, 51c, and 51d. The blowing openings 51b, 51c, and 51d are aligned side by side in a direction of a circumference centered at a shaft center S of the rotation shaft 40. Hereinafter, the direction of the circumference centered at the shaft center S of the rotation shaft 40 is referred to simply as the circumferential direction.

In the present embodiment, the blowing openings 51b, 51c, and 51d are located on the upper side of the rotary door 15 in the vertical direction. The face blowing opening 51c is located next to the defroster blowing opening 51b on a first side in the circumferential direction. The foot blowing opening 51d is located next to the face blowing opening 51c on the first side in the circumferential direction.

The face blowing opening 51c is a blowing opening from which air-conditioning air is blown out toward an upper half of an occupant in the compartment. The foot blowing opening 51d is a blowing opening from which air-conditioning air is blown out toward a lower half of the occupant. The defroster blowing opening 51b is a blowing opening from which air-conditioning air is blown out toward an inner surface of a glass window in the compartment.

The case peripheral wall portion 50 is provided with the inlet openings 30a and 30b. The inlet openings 30a and 30b are located on the lower side of the rotary door 15 in the vertical direction. The inlet opening 30a communicates with the hot air passage 16. Hot air from the hot air passage 16 thus blows out from the inlet opening 30a to the rotary door 15. The inlet opening 30b communicates with the cold air bypass passage 17. Cold air from the cold air bypass passage 17 thus blows out from the inlet opening 30b to the rotary door 15. The rotary door 15 allows the hot air that blows out from the inlet opening 30a and cold air that blows out from the inlet opening 30b to blow to any one of the blowing openings 51b, 51c, and 51d.

Figure 3:
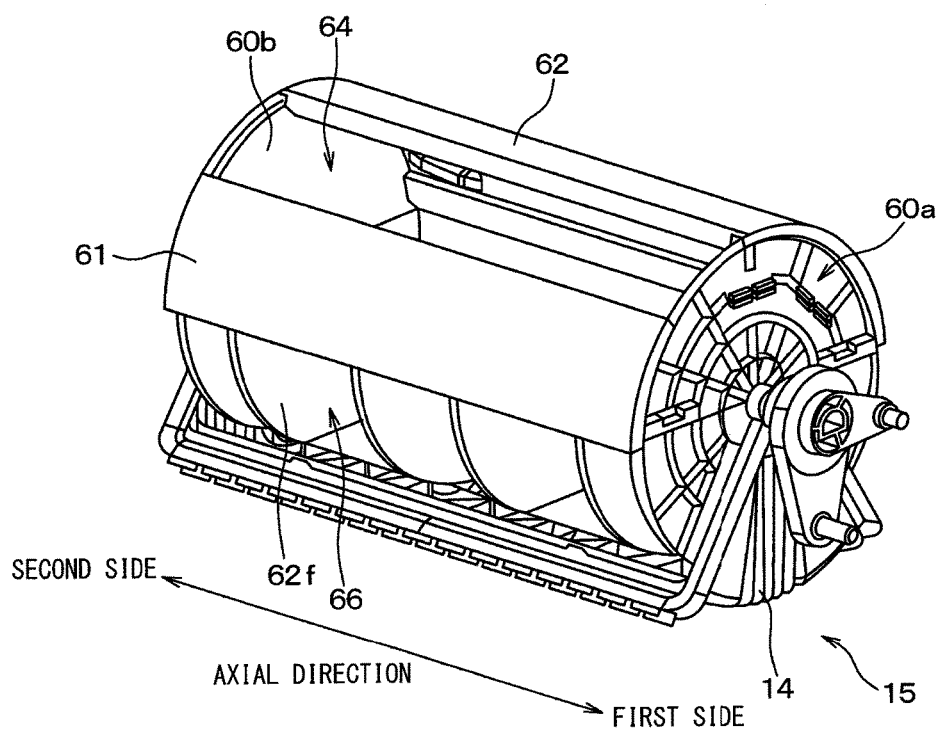
FIG. 3 is a perspective view of a rotary door of the first embodiment.

A specific structure of the rotary door 15 of the present embodiment will now be described with reference to FIG. 1 and FIG. 3. FIG. 3 is a perspective view of the rotary door 15. FIG. 1 is a cross section orthogonal to an axial direction of the rotary door 15.

As are shown in FIG. 1 and FIG. 3, the rotary door 15 includes door side walls 60a and 60b (only the door side wall 60a is shown in FIG. 1), outer peripheral portions 61, 62, and 63, and door openings 64, 65, 66.

The door side walls 60a and 60b are formed in a circular plate shape and disposed at an interval, respectively, on a first side and a second side in an axial direction of the rotation shaft 40. The axial direction of the rotation shaft 40 coincides with the vehicular width direction (a direction perpendicular to a sheet surface of FIG. 1). The rotation shaft 40 is provided to each of the door side walls 60a and 60b. The rotation shafts 40 are provided to protrude outward (that is, in the vehicular width direction) from the corresponding door side walls 60a and 60b.

The respective outer peripheral portions 61, 62, and 63 shown in FIG. 1 and FIG. 3 are provided between the door side walls 60a and 60b and formed in a plate shape extending in the circumferential direction about the rotation shaft 40. In short, the outer peripheral portions 61, 62, and 63 are formed in an arc shape about the rotation shaft 40 in cross section.

The outer peripheral portions 61, 62, and 63 are disposed at intervals in the circumferential direction about the shaft center S of the rotation shaft 40. The outer peripheral portion 62 is disposed next to the outer peripheral portion 61 on the first side in the circumferential direction. The outer peripheral portion 63 is disposed next to the outer peripheral portion 62 on the first side in the circumferential direction.

The outer peripheral portion 62 of the present embodiment is provided with an air guide 62e which guides an airflow.

The door opening 64 is located on the first side of the outer peripheral portion 61 in the circumferential direction in a space between the outer peripheral portions 61 and 62. The door opening 65 is located on the first side of the outer peripheral portion 62 in the circumferential direction in a space between the outer peripheral portions 62 and 63. The door opening 66 is located on the first side of the outer peripheral portion 63 in the circumferential direction in a space between the outer peripheral portions 63 and 61.

The outer peripheral portion 61 includes a door base 61c extending in the circumferential direction and a film 61d. The film 61d is provided to cover the door base 61c from outside in the direction of a radius. The film 61d is a seal member which hermetically closes a space between the case peripheral wall portion 50 and the door base 61c. As with the outer peripheral portion 61, the outer peripheral portion 62 includes a door base 62c and a film 62d. As with the outer peripheral portion 61, the outer peripheral portion 63 includes a door base 63c and a film 63d.

In the present embodiment configured as above, a door space 67 surrounded by the case peripheral wall portion 50, the door side walls 60a and 60b, and the outer peripheral portions 61, 62, and 63 is defined inside the rotary door 15 in the case 11. An area of the door space 67 in cross section including the shaft center S of the rotation shaft 40 is larger than opening areas of the respective blowing openings 51b, 51c, and 51d. The area of the door space 67 in cross section including the shaft center S of the rotation shaft 40 is larger than opening areas of the respective inlet openings 30a and 30b.

Multiple air guides 62f are aligned side by side at intervals in the axial direction of the rotation shaft 40 in the rotary door 15.

A specific operation of the rotary door 15 of the present embodiment will now be described. FIG. 4 through FIG. 8 show respective operating states of the rotary door 15.

Figure 4:
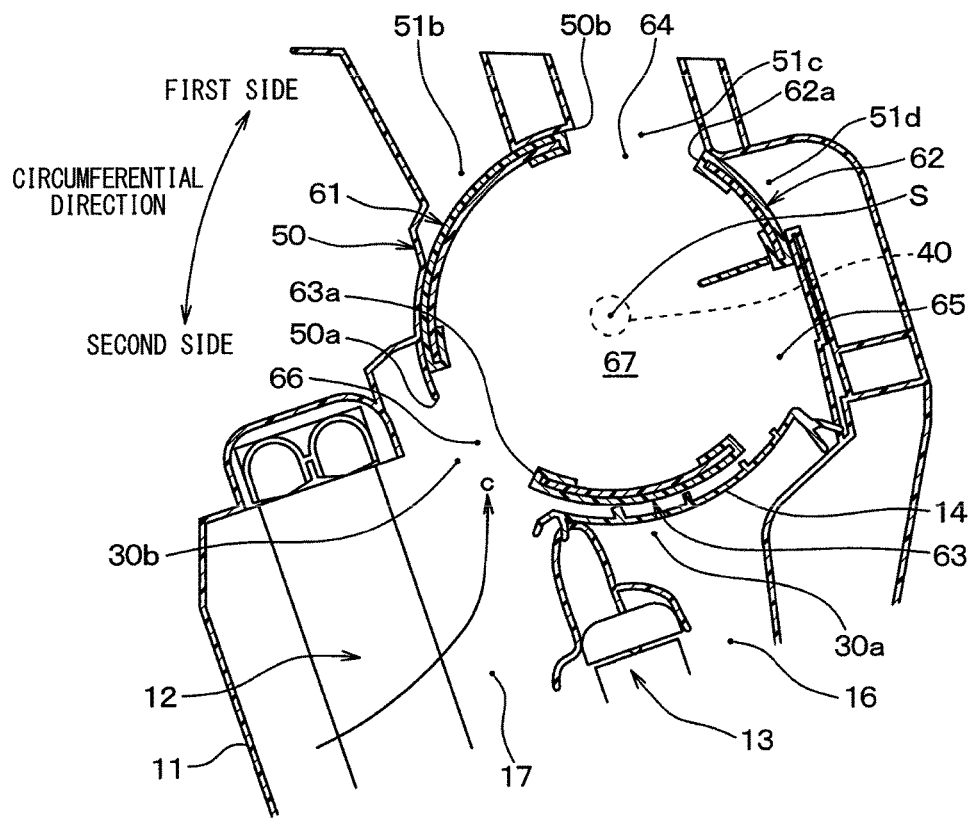
FIG. 4 is a cross section of the air conditioner in a face mode in the first embodiment.

In a face mode shown in FIG. 4, the outer peripheral portion 61 closes the defroster blowing opening 51b and the outer peripheral portion 62 closes the foot blowing opening 51d.

The door opening 66 communicates with the inlet opening 30b and the door opening 64 communicates with the face blowing opening 51c. FIG. 4 shows the air mixing door 14 fully opening the inlet opening 30b and fully closing the inlet opening 30a. Under conditions as above, the door opening 64 is formed in a direction normal to an opening cross section of the door opening 66. Cold air (see an arrow c) from the cold air bypass passage 17 thus flows to the inlet opening 30b, the door opening 66, and the door space 67. The cold air is blown into the compartment from the door space 67 through the door opening 64 and the face blowing opening 51c.

The inlet opening 30b and the door opening 66 communicate with each other, and a cross-sectional area of a flow path through which an airflow passes through the inlet opening 30b and the door opening 66 is defined as an area A1 (first area). The face blowing opening 51c and the door opening 64 communicate with each other, and a cross-sectional area of a flow path through which an airflow passes through the face blowing opening 51c and the door opening 64 is defined as an area B1 (second area). Then, the area A1 and the area B1 are equal to each other.

The term, "a cross-sectional area of a flow path", referred to in the present embodiment means an area (flow area) of a flow path in cross section orthogonal to an air flowing direction in an air flow path where an airflow flows. For example, the area A1 is an area of a flow path in cross section orthogonal to an air flowing direction in an air flow path formed when an airflow passes through the inlet opening 30b and the door opening 66. The area B1 is an area of a flow path in cross section orthogonal to an air flowing direction in an air flow path formed when an airflow passes through the face blowing opening 51c and the door opening 64.

The area A1 is determined by the door side walls 60a and 60b, an end 63a of the outer peripheral portion 63, and an end 50a of the case peripheral wall portion 50. The end 63a is an end of the outer peripheral portion 63 on the first side in the circumferential direction. The end 50a of the case peripheral wall portion 50 is an end on the first side in the circumferential direction in a portion where the inlet opening 30b is provided to the case peripheral wall portion 50.

The area B1 is determined by the door side walls 60a and 60b, an end 62a of the outer peripheral portion 62, and an end 50b of the case peripheral wall portion 50. The end 62a is an end of the outer peripheral portion 62 on the second side in the circumferential direction. The end 50b of the case peripheral wall portion 50 is an end on the second side in the circumferential direction in a portion where the face blowing opening 51c is provided to the case peripheral wall portion 50.

Owing to the configuration as above, the rotary door 15 forms a straight silencer of an expansion type. Hence, cold air blown out from the cooling heat exchanger 12 enters the door space 67 after the cold air is squeezed at the door opening 66. It should be noted that air expands in the door space 67 and the expanded air is squeezed at the door opening 64. Because air expands in the door space 67, a velocity of an airflow decreases. Pulsation of an airflow that causes noise is thus reduced.

Figure 5:
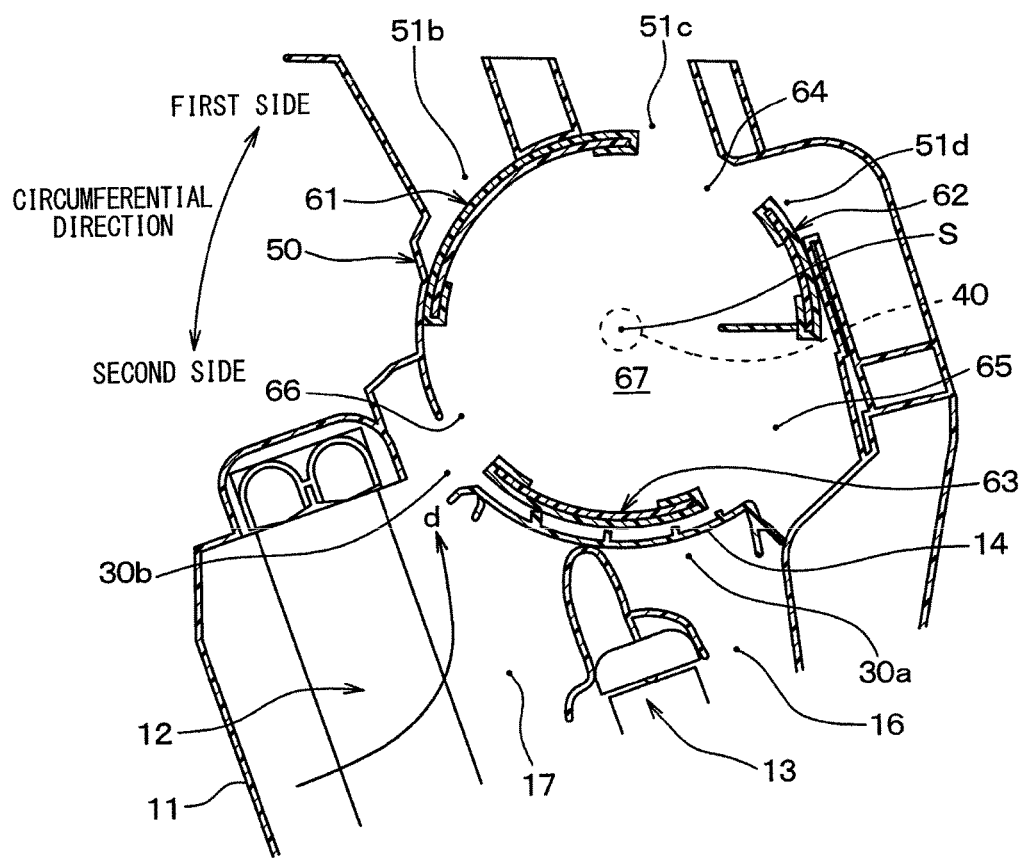
FIG. 5 is a cross section of the air conditioner in a bi-level mode in the first embodiment.

When the rotary door 15 rotates clockwise, the face mode switches to a bi-level mode shown in FIG. 5. In the bi-level mode, the outer peripheral portion 61 closes the defroster blowing opening 51b and the door opening 64 communicates with both of the face blowing opening 51c and the foot blowing opening 51d. Also, the door opening 66 communicates with the inlet opening 30b. In FIG. 5, the air mixing door 14 fully opens the inlet opening 30b and fully closes the inlet opening 30a. Under conditions as above, cold air (see an arrow d) from the cold air bypass passage 17 flows to the inlet opening 30b, the door opening 66, and the door space 67. A part of the cold air flowing into the door space 67 is blown into the compartment through the door opening 64 and the face blowing opening 51c. In addition, a rest of the cold air flowing into the space 67 other than the part specified above is blown into the compartment through the door opening 64 and the foot blowing opening 51d.

Figure 6:
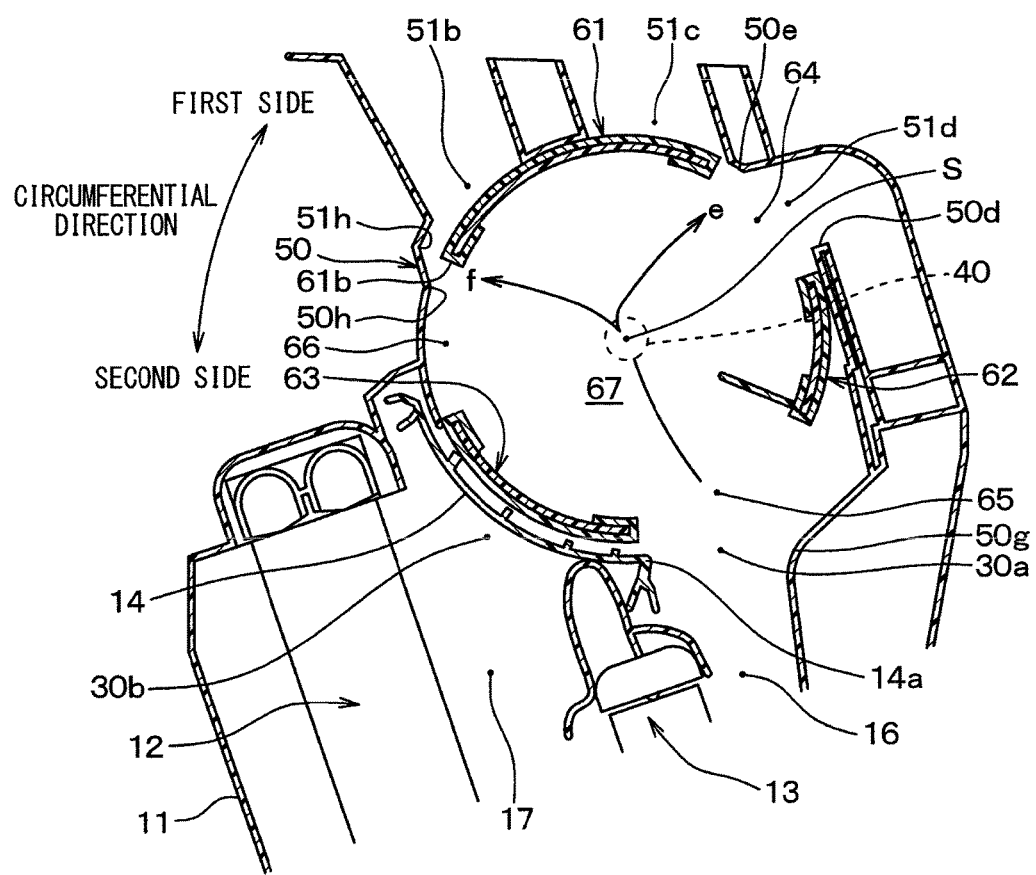
FIG. 6 is a cross section of the air conditioner in a foot mode in the first embodiment.

When the rotary door 15 further rotates clockwise, the bi-level mode switches to a foot mode shown in FIG. 6. In the foot mode, the outer peripheral portion 61 closes the face blowing opening 51c and the door opening 66 slightly communicates with the defroster blowing opening 51b while the door opening 64 communicates with the foot blowing opening 51d. Under the conditions as above, the outer peripheral portion 61 faces the door opening 65 across the shaft center S of the rotation shaft 40. In FIG. 6, the air mixing door 14 fully closes the inlet opening 30b and fully opens the inlet opening 30a. The rotary door 15 thus forms a right-angled silencer of an expansion type.

Herein, the air mixing door 14 fully closes the inlet opening 30b and fully opens the inlet opening 30a. Under conditions as above, hot air from the hot air passage 16 flows to the inlet opening 30a and the door opening 65 and toward the shaft center S in the door space 67. As is indicated by an arrow e, most of the hot air is blown into the compartment from the door space 67 through the door opening 64 and the foot blowing opening 51d. Meanwhile, as is indicated by an arrow f, a part of the hot air flowing into the door space 67 from the hot air passage 16 is blown into the compartment through the door opening 66 and the defroster blowing opening 51b.

The inlet opening 30*a* and the door opening 65 communicate with each other, and a cross-sectional area of a flow path through which an airflow passes through the inlet opening 30*a* and the door opening 65 is defined as an area A2. The defroster blowing opening 51*b* and the door opening 66 communicate with each other, and a cross-sectional area of a flow path through which an airflow passes through the defroster blowing opening 51*b* and the door opening 66 is defined as an area B2*a*. The foot blowing opening 51*d* and the door opening 64 communicate with each other, and a cross-sectional area of a flow path through which an airflow passes through the foot blowing opening 51*d* and the door opening 64 is defined as an area B2*b*. Then, the area A2 and the area B2*b* (>B2*a*) are equal to each other and the area B2*b* is larger than the area B2*a*.

The area A2 is determined by the door side walls 60*a* and 60*b*, an end 14*a* of the air mixing door 14, and an end 50*g* of the case peripheral wall portion 50. The end 14*a* of the air mixing door 14 is an end of the air mixing door 14 on the second side in the circumferential direction. Herein, it is the air mixing door 14 that adjusts the area A2. The end 50*g* of the case peripheral wall portion 50 is an end on the second side in the circumferential direction in a portion where the inlet opening 30*a* is provided to the case peripheral wall portion 50.

The area B2*a* is determined by the door side walls 60*a* and 60*b*, an end 61*b* of the outer peripheral portion 61, and an end 50*h* of the case peripheral wall portion 50. The end 50*h* is a nearest part to the end 61*b* in a portion where the defroster blowing opening 51*b* is provided to the case peripheral wall portion 50. The end 61*b* of the outer peripheral portion 61 is an end of the outer peripheral portion 61 on the second side in the circumferential direction.

The area B2*b* is determined by the door side walls 60*a* and 60*b* and ends 50*d* and 50*e* of the case peripheral wall portion 50. The end 50*d* is an end on the first side in the circumferential direction in a portion where the foot blowing opening 51*d* is provided to the case peripheral wall portion 50. The end 50*e* is an end on the second side in the circumferential direction in the portion where the foot blowing opening 51*d* is provided to the case peripheral wall portion 50.

Owing to the configuration as above, hot air blown out from the hot air passage 16 enters the door space 67 after the hot air is squeezed at the door opening 65. It should be noted that air expands in the door space 67 and the expanded air is squeezed at the door opening 64. Because air expands in the door space 67, a velocity of an airflow decreases. Pulsation of an airflow that causes noise is thus reduced.

Figure 7:
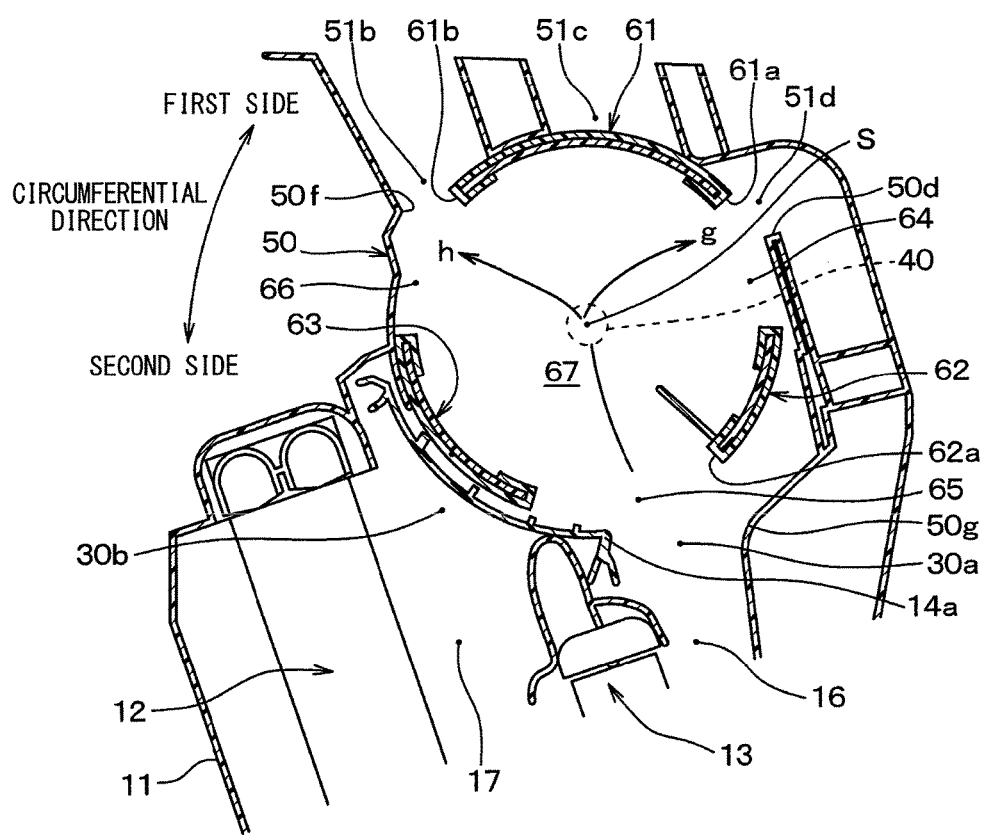
FIG. 7 is a cross section of the air conditioner in a foot-defroster mode in the first embodiment.

When the rotary door 15 further rotates clockwise, the foot mode switches to a foot-defroster mode shown in FIG. 7. In the foot-defroster mode, the outer peripheral portion 61 closes the face blowing opening 51*c*, the door opening 66 communicates with the defroster blowing opening 51*b*, the door opening 64 communicates with the foot blowing opening 51*d*, and the door opening 65 communicates with the inlet opening 30*a*. In FIG. 7, the air mixing door 14 fully closes the inlet opening 30*b* and fully opens the inlet opening 30*a*.

Under conditions as above, hot air from the hot air passage 16 flows to the inlet opening 30*a* and the door opening 65 and toward the shaft center S in the door space 67. As is indicated by an arrow g, a part of the hot air flowing as above is blown into the compartment from the door space 67 through the door opening 64 and the foot blowing opening 51*d*. Meanwhile, as is indicated by an arrow h, a rest of the hot air flowing from the hot air passage 16 into the door space 67 other than the part specified above is blown into the compartment through the door opening 66 and the defroster blowing opening 51*b*.

The inlet opening 30*a* and the door opening 65 communicate with each other, and a cross-sectional area of a flow path through which an airflow passes through the inlet opening 30*a* and the door opening 65 is defined as an area A3. The defroster blowing opening 51*b* and the door opening 66 communicate with each other, and a cross-sectional area of a flow path through which an airflow passes through the defroster blowing opening 51*b* and the door opening 66 is defined as an area B3*a*. The foot blowing opening 51*d* and the door opening 64 communicate with each other, and a cross-sectional area of a flow path through which an airflow passes through the foot blowing opening 51*d* and the door opening 64 is defined as an area B3*b*. Further, let an area B3 (=B3*a*+B3*b*) be a sum of the area B3*a* and the area B3*b*. Then, the area B3 and the area A3 are equal to each other.

The area A3 is determined by the door side walls 60*a* and 60*b*, the end 14*a* of the air mixing door 14, and the end 62*a* of the outer peripheral portion 62. The end 14*a* of the air mixing door 14 is the end of the air mixing door 14 on the second side in the circumferential direction. Herein, it is the air mixing door 14 that adjusts the area A3. The end 62*a* of the outer peripheral portion 62 is the end of the outer peripheral portion 62 on the second side in the circumferential direction.

The area B3*a* is determined by the door side walls 60*a* and 60*b*, the end 61*b* of the outer peripheral portion 61, and an end 50*f* of the case peripheral wall portion 50. The end 50*f* is an end on the second side in the circumferential direction in a portion where the defroster blowing opening 51*b* is provided to the case peripheral wall portion 50. The end 61*b* of the outer peripheral portion 61 is the end of the outer peripheral portion 61 on the second side in the circumferential direction.

The area B3*b* is determined by the door side walls 60*a* and 60*b*, an end 61*a* of the outer peripheral portion 61, and the end 50*d* of the case peripheral wall portion 50. The end 61*a* of the outer peripheral portion 61 is an end of the outer peripheral portion 61 on the first side in the circumferential direction. The end 50*d* is the end on the first side in the circumferential direction in the portion where the foot blowing opening 51*d* is provided to the case peripheral wall portion 50.

Owing to the configuration as above, hot air blown out from the hot air passage 16 enters the door space 67 after the hot air is squeezed at the door opening 65. It should be noted that air expands in the door space 67 and the expanded air is squeezed at the door opening 64. Because air expands in the door space 67, a velocity of an airflow decreases. Pulsation of an airflow that causes noise is thus reduced.

Figure 8:
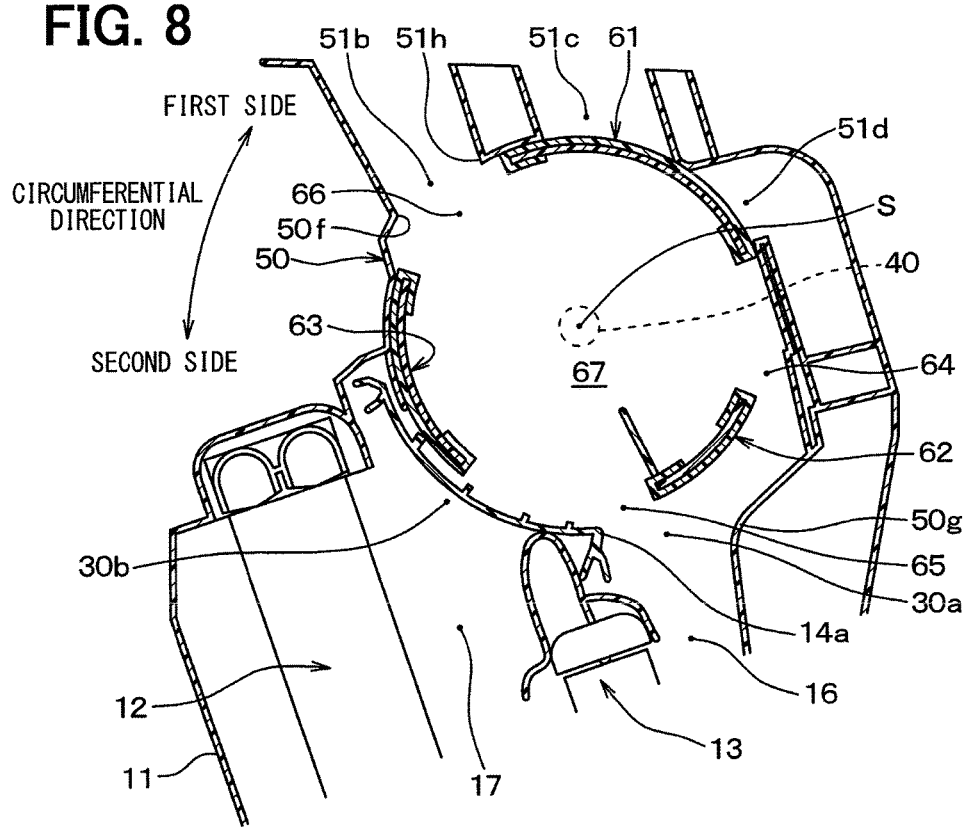
FIG. 8 is a cross section of the air conditioner in a defroster mode in the first embodiment.

When the rotary door 15 further rotates clockwise, the foot-defroster mode switches to a defroster mode shown in FIG. 8. In the defroster mode, the outer peripheral portion 61 closes both of the face blowing opening 51*c* and the foot blowing opening 51*d*. Further, the door opening 66 communicates with the defroster blowing opening 51*b* and both of the door openings 65 and 64 communicate with the inlet opening 30*a*. In FIG. 8, the air mixing door 14 fully closes the inlet opening 30*b* and fully opens the inlet opening 30*a*.

Under conditions as above, hot air from the hot air passage 16 is blown into the compartment through the inlet opening 30*a*, the door openings 65 and 64, the door space 67, the door opening 66, and the defroster blowing opening 51*b*.

The inlet opening 30a and the respective door openings 65 and 64 communicate with each other, and a cross-sectional area of a flow path through which an airflow passes through the inlet opening 30a and both the door openings 65 and 64 is defined as an area A4. The defroster blowing opening 51b and the door opening 66 communicate with each other, and a cross-sectional area of a flow path through which an airflow passes through the defroster blowing opening 51b and the door opening 66 is defined as an area B4. Then, the area A4 and the area B4 are equal to each other.

The area A4 is determined by the door side walls 60a and 60b, the end 14a of the air mixing door 14, and the end 50g of the case peripheral wall portion 50. The end 14a of the air mixing door 14 is the end of the air mixing door 14 on the second side in the circumferential direction. The end 50g of the case peripheral wall portion 50 is the end on the second side in the circumferential direction in the portion where the inlet opening 30a is provided to the case peripheral wall portion 50.

The area B4 is determined by the door side walls 60a and 60b and the end 50f and an end 51h of the case peripheral wall portion 50. The end 50f is the end on the second side in the circumferential direction in the portion where the defroster blowing opening 51b is provided to the case peripheral wall portion 50. The end 51h is an end on the first side in the circumferential direction in the portion where the defroster blowing opening 51b is provided to the case peripheral wall portion 50.

Owing to the configuration as above, hot air blown out from the hot passage 16 enters the door space 67 after the hot air is squeezed at the respective door openings 65 and 64. It should be noted that air expands in the door space 67 and the expanded air is squeezed at the door opening 64. Because air expands in the door space 67, a velocity of an airflow decreases. Pulsation of an airflow that causes noise is thus reduced.

According to the embodiment described above, in the face mode, the area A1 which is a cross-sectional area of a flow path when an airflow passes through the inlet opening 30b and the door opening 66 is equal to the area B1 which is a cross-sectional area of a flow path when an airflow passes through the face blowing opening 51c and the door opening 64. Hence, pulsation of an airflow can be reduced because air expands in the door space 67 when the airflow flows into the door space 67 from the inlet opening 30b.

In the foot mode, the area A2 which is a cross-sectional area of a flow path when an airflow passes through the inlet opening 30b and the door opening 65 is equal to the area B2b which is a cross-sectional area of a flow path when an airflow passes through the foot blowing opening 51d and the door opening 64.

In the foot-defroster mode, the area A3 which is a cross-sectional area of a flow path when an airflow passes through the inlet opening 30a and the door opening 65 is equal to the area B3 (=B3a+B3b) which is a cross-sectional area of a flow path when an airflow passes through both of the blowing openings 51b and 51d and both of the door openings 66 and 64.

In the defroster mode, the area A4 which is a cross-sectional area of a flow path when an airflow passes through the inlet opening 30a and both of the door openings 65 and 64 is equal to the area B4 which is a cross-sectional area of a flow path when an airflow passes through the defroster blowing opening 51b and the door opening 66.

Consequently, in the foot mode, the foot-defroster mode, and the defroster mode, pulsation of an airflow can be reduced because air expands in the door space 67 when the airflow flows into the door space 67 from the inlet opening 30a. Hence, a level of noise at a target frequency can be lowered by designing an attenuation ratio of the rotary door 15. The vehicular air conditioner 1 capable of lowering a noise level by using the rotary door 15 can be thus provided.

In the present embodiment, the outer peripheral portions 61, 62, and 63 are provided in such a manner that the door opening 65 faces the outer peripheral portion 61 across the shaft center S of the rotation shaft 40 in the foot-defroster mode. An inner side of the outer peripheral portion 61 in the direction of the radius is formed in an arc shape about the rotation shaft S of the rotation shaft 40.

Hence, pulsation of hot air introduced from the hot air passage 16 toward the shaft center S in the door space 67 through the door opening 65 is reflected toward the shaft center S in the door space 67 on the inner side of the outer peripheral portion 61 in the direction of the radius. Pulsation of hot air reflected in the manner as above and pulsation of hot air introduced from the hot air passage 16 toward the shaft center S in the door space 67 through the door opening 65 cancel each other out. The noise level in the door space 67 can be thus lowered further.

A noise reduction effect by the rotary door 15 of the present embodiment will now be described with reference to FIG. 9 through FIG. 13. In the following description, the term, "a dimension (mm)", is also used as an equivalent to the area.

Figure 9:
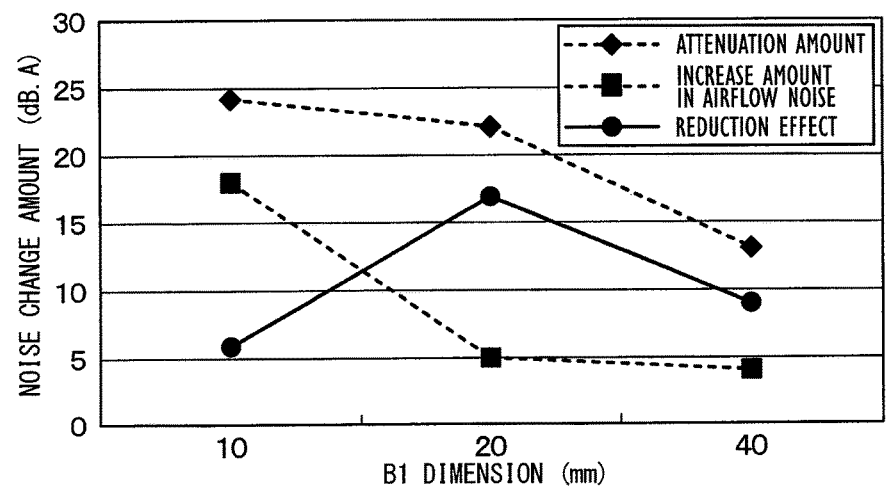
FIG. 9 shows a chart showing a noise attenuation amount, an increase amount in airflow noise, and a noise reduction effect by the rotary door when an area A1 is 20 mm in the first embodiment.
Figure 10:
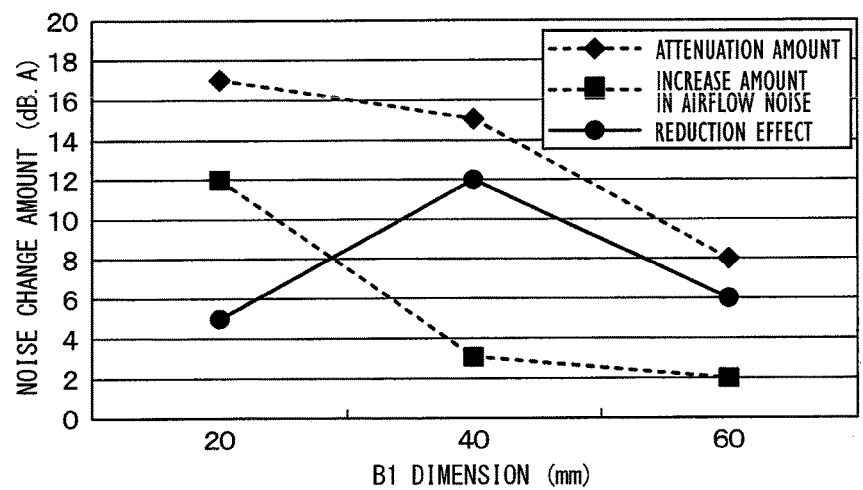
FIG. 10 shows a chart showing a noise attenuation amount, an increase amount in airflow noise, and a noise reduction effect by the rotary door when the area A1 is 40 mm in the first embodiment.
Figure 11:
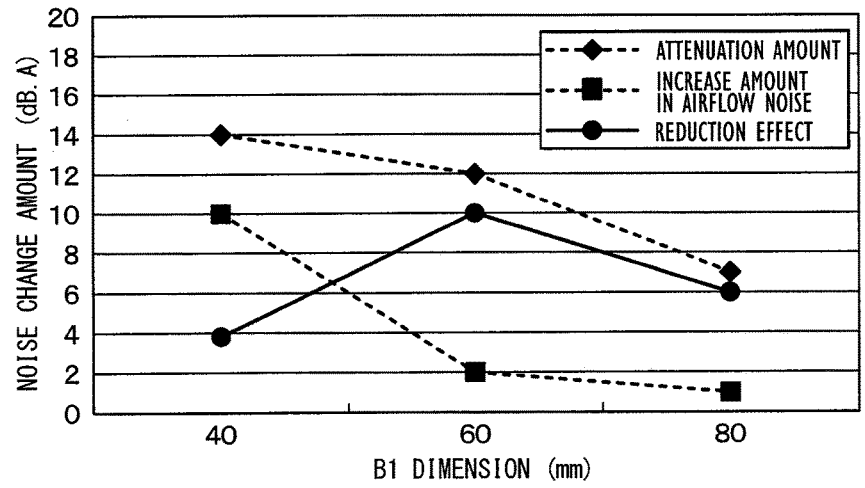
FIG. 11 shows a chart showing a noise attenuation amount, an increase amount in airflow noise, and a noise reduction effect by the rotary door when the area A1 is 60 mm in the first embodiment.

FIG. 9, FIG. 10, and FIG. 11 show reduction effects on noise at a target frequency of 800 Hz in the face mode. An abscissa is used for the area B1 (dimension B1) and an ordinate is used for a noise attenuation amount, an increase amount in airflow noise, and a noise reduction effect. A noise attenuation amount is a noise attenuation amount due to expansion of air in the rotary door 15. An increase amount in airflow noise is an increase amount in a level of noise generated when air passes through the door openings 64, 65, and 66 of the rotary door 15, that is, a value indicating a difference between a noise level and a predetermined reference value. A noise reduction effect is a noise reduction effect by the rotary door 15 and determined by a difference between a noise attenuation amount and an increase amount in airflow noise.

FIG. 9 shows a noise reduction effect when the area A1 (dimension A1) is 20 mm. When the area B1 is 20 mm, a difference between an attenuation amount and an increase amount in airflow noise becomes larger than when the area B1 is 10 mm or 40 mm. Hence, a noise reduction effect is most significant when the area A1 is 20 mm.

FIG. 10 shows a noise reduction effect when the area A1 is 40 mm. When the area B1 is 40 mm, a difference between an attenuation amount and an increase amount in airflow noise becomes larger than when the area B1 is 20 mm or 60 mm. Hence, a noise reduction effect is most significant when the area A1 is 40 mm.

FIG. 11 shows a noise reduction effect when the area A1 is 60 mm. When the area B1 is 60 mm, a difference between an attenuation amount and an increase amount in airflow noise becomes larger than when the area B1 is 40 mm or 80 mm. Hence, a noise reduction effect is most significant when the area A1 is 60 mm.

Figure 12:
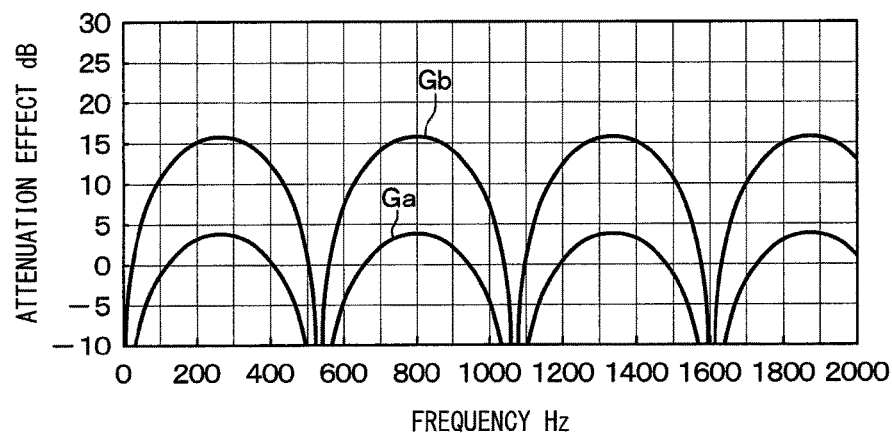
FIG. 12 shows graphs showing a noise reduction effect by the rotary door in the first embodiment.

FIG. 12 shows graphs Ga and Gb using an abscissa for a frequency of noise and an ordinate for noise reduction effects when the areas A1 and B1 are 40 mm or 20 mm. The graph Ga is a graph when the area A1 is 40 mm and the area B1 is 20 mm and the graph Gb is a graph when the area A1 is 20 mm and the area B1 is 20 mm.

It is understood from the above descriptions that a noise reduction effect is most significant when the area A1 and the area B1 are equal to each other.

Figure 13:
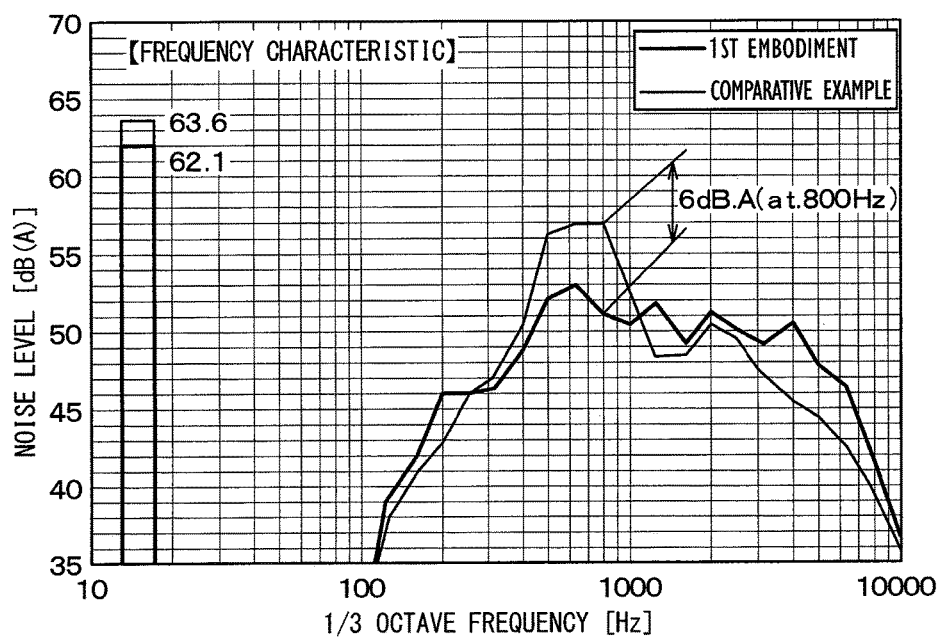
FIG. 13 shows a chart of a noise level with the rotary door of the first embedment in contrast to a noise level with a rotary door of a comparative example.

FIG. 13 shows a graph using an abscissa for a ⅓ octave frequency and an ordinate for a noise level. A thick line of FIG. 13 represents a noise level when the area A1 and the area B1 are made to be equal to each other by using the rotary door 15 of the first embodiment of the present disclosure. A thin line of FIG. 13 represents a noise level when a rotary door of a comparative example is used and the area A1 and the area B1 are not equal to each other. It is understood from FIG. 13 that a noise reduction effect becomes more significant when the area A1 and the area B1 are made to be equal to each other by using the rotary door 15.

In the present embodiment, a level of noise at a target frequency is lowered by designing an attenuation ratio of the rotary door 15 in the manner described above. Hence, restrictions imposed by cost and manufacturing reasons can be easily lifted. In addition, a size can be reduced in comparison with a case where a silencer is formed separately from the rotary door 15.

Second Embodiment

A second embodiment will describe a case where a sound deadening material is provided to outer peripheral portions 61, 62, and 63 of a rotary door 15 of the second embodiment.

Figure 14:
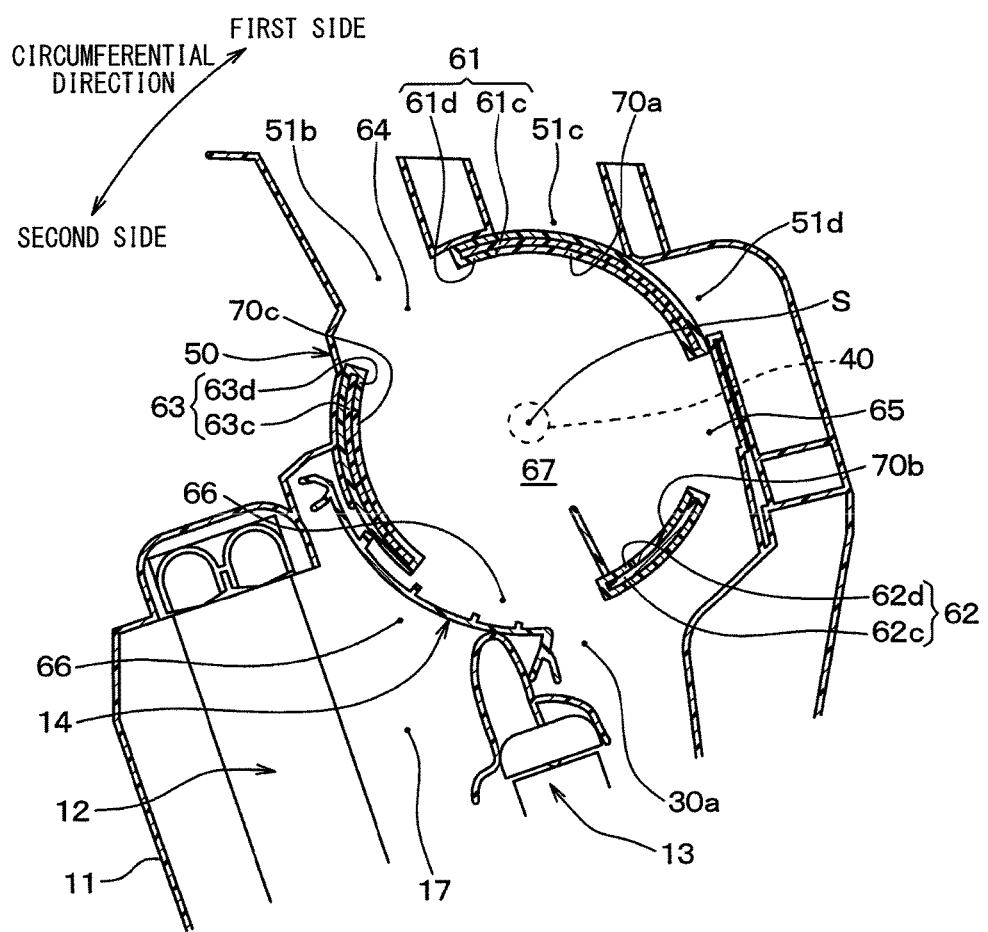
FIG. 14 is a cross section of an air conditioner according to a second embodiment of the present disclosure.

FIG. 14 is a cross section of the rotary door 15 of the present embodiment.

A sound deadening material 70a is additionally provided to an inner side of the outer peripheral portion 61 of the rotary door 15 of the present embodiment in a direction of a radius about a shaft center S of a rotation shaft 40. A film of the sound deadening material 70a is provided to conform to a door base 61c on the inner side in the direction of the radius. A sound deadening material 70b is additionally provided to an inner side of the outer peripheral portion 62 of the rotary door 15 in the direction of the radius. A film of the sound deadening material 70b is provided to conform to a door base 62c on the inner side in the direction of the radius. A sound deadening material 70c is additionally provided to an inner side of the outer peripheral portion 63 of the rotary door 15 in the direction of the radius. A film of the sound deadening material 70c is provided to conform to a door base 63c on the inner side in the direction of the radius.

In the present embodiment, the sound deadening materials 70a, 70b, and 70c may be a sound absorbing member, for example, elastomer, which exerts a silencing effect.

According to the present embodiment as described above, because the sound deadening materials 70a, 70b, and 70c are provided to the rotary door 15, noise at a frequency other than a target frequency set by designing an attenuation ratio in the first embodiment above can be reduced, too. Hence, the configuration as above is capable of reducing noise at frequencies at which a sound deadening effect cannot be exerted by designing an attenuation ratio of the rotary door 15.

Third Embodiment

A third embodiment will describe a case where the counterpart of the first embodiment above is additionally provided with an adjusting door 80 which adjusts a cross-sectional area of a flow path at one of the blowing openings 51b, 51c, and 51d from which air blows out and another adjusting door 81 which adjusts a cross-sectional area of a flow path at one of the inlet openings 30a and 30b into which air flows.

Figure 15:
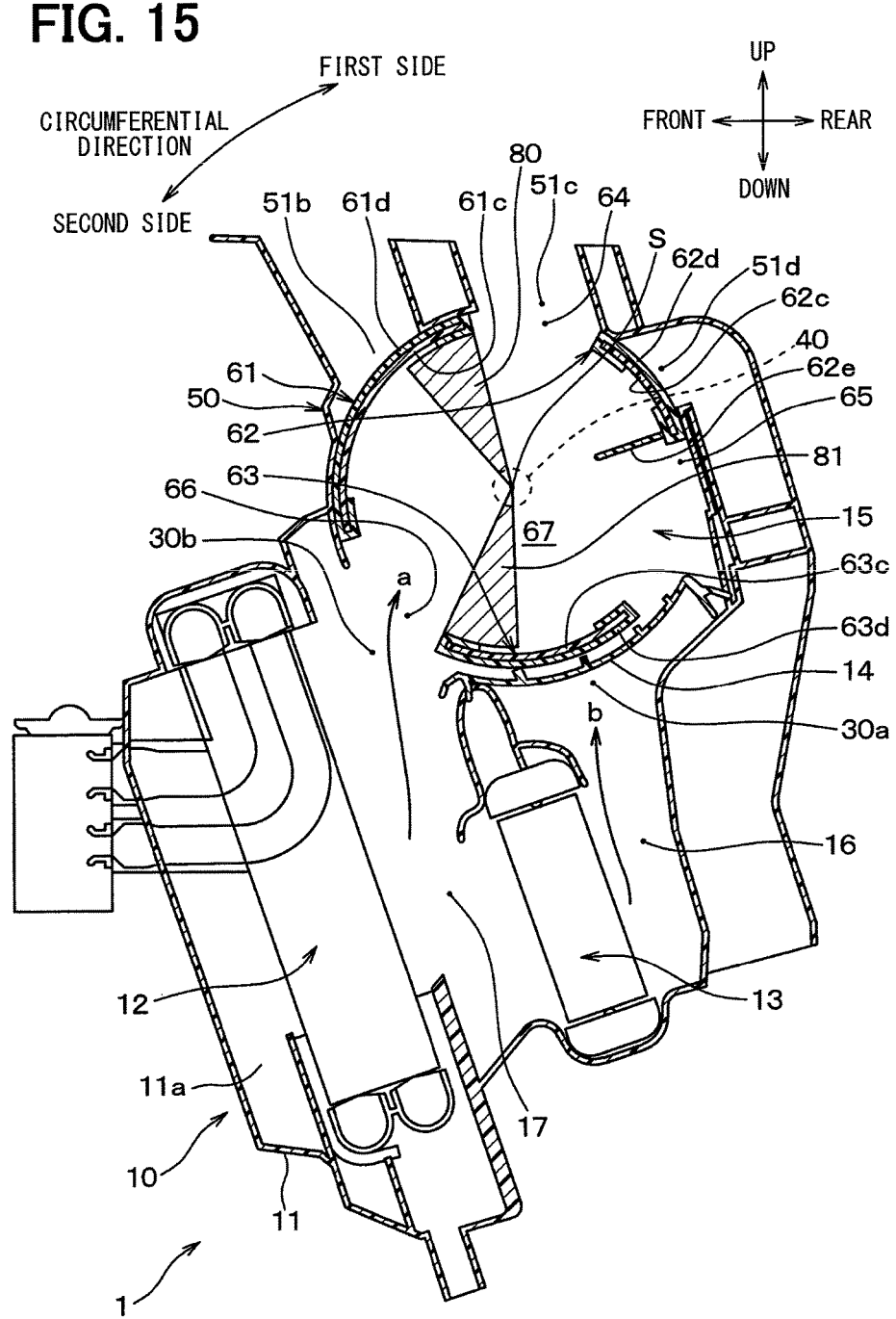
FIG. 15 is a cross section of a vehicular air conditioner according to a third embodiment of the present disclosure.

FIG. 15 is a view showing a sectional configuration of an air conditioning unit 10 of a vehicular air conditioner 1 of the present embodiment. FIG. 15 shows a case where the adjusting doors 80 and 81 are additionally provided to the configuration of FIG. 1. In FIG. 15, like components are labeled with like reference numerals with respect to FIG. 1 and a description of such components is not repeated herein.

The respective adjusting doors 80 and 81 are disposed on an inner side of outer peripheral portions 61, 62, and 63 of a rotary door 15 in a direction of a radius about a rotary shaft S of a rotation shaft 40. The respective adjusting doors 80 and 81 are supported on the rotation shaft 40 in a rotatable manner about the rotation shaft S of the rotation shaft 40.

Figure 16A:
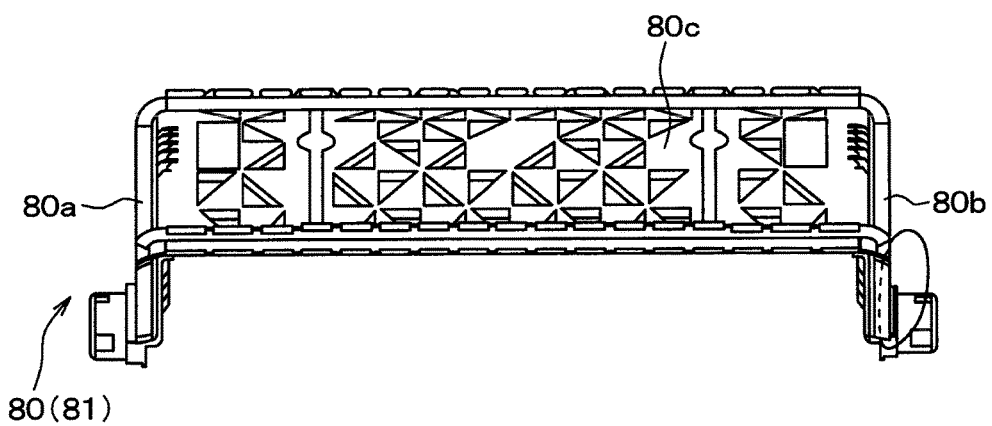
FIG. 16A is a perspective view of an adjusting door in the vehicular air conditioner of the third embodiment.
Figure 16B:
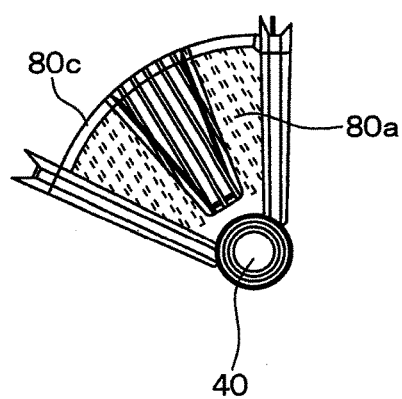
FIG. 16B is a side view of the adjusting door in the vehicular air conditioner of the third embodiment.
Figure 17:
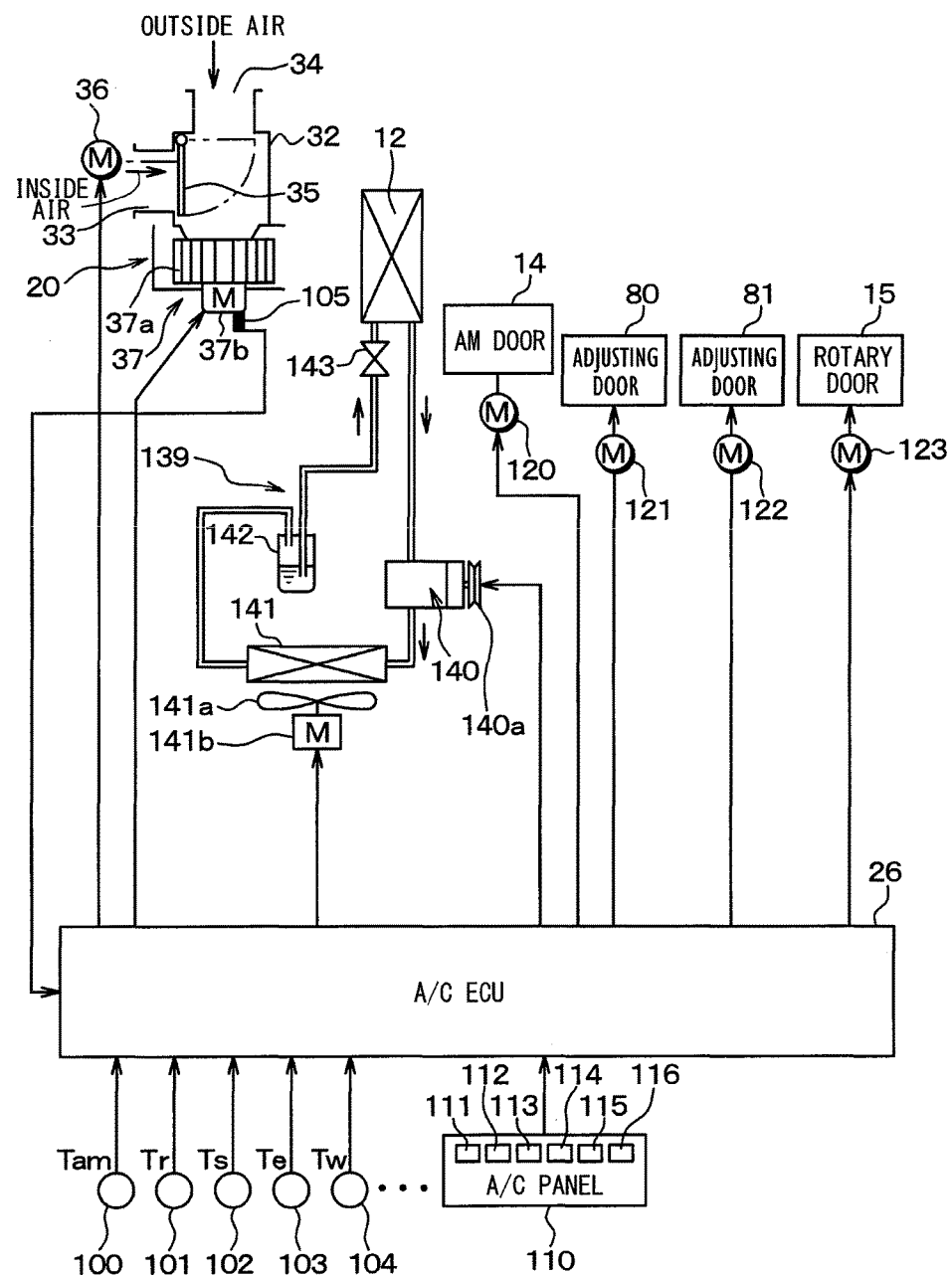
FIG. 17 is a view showing an electrical configuration of the vehicular air conditioner of the third embodiment.

As are shown in FIG. 16A and FIG. 16B, the adjusting door 80 includes door side walls 80a and 80b and an outer peripheral portion 80c.

The door side walls 80a and 80b are formed in a fan shape and provided at an interval, respectively, on a first side and a second side in an axial direction of the rotation shaft 40. The axial direction of the rotation shaft 40 coincides with a vehicular width direction (a direction perpendicular to a sheet surface of FIG. 16B). The door side walls 80a and 80b are supported on the rotation shaft 40 in a rotatable manner. The outer peripheral portion 80c is provided between the door side walls 80a and 80b and formed in a plate shape extending in a direction of a circumference about the rotation shaft 40. In short, the outer peripheral portion 80c is formed in an arc shape about the rotation shaft 40 in cross section. The outer peripheral portion 80c is disposed on the inner side of the outer peripheral portions 61, 62, and 63 in the direction of the radius about the rotation shaft 40.

The adjusting door 81 includes the door side walls 80a and 80b and the outer peripheral portion 80c. The adjusting door 81 is formed substantially in a same manner as the adjusting door 80 and a description is omitted herein.

An air blowing unit 20 of the vehicular air conditioner 1 of the present embodiment includes an inside-outside air switching box 32 and an air blower 37. The inside-outside air switching box 32 is disposed uppermost stream of an air introduction port 11a of a case 11. The inside-outside air switching box 32 opens and closes an inside air introduction port 33 and an outside air introduction port 34 by switching an inside-outside air switching door 35. The inside-outside air switching door 35 is driven by a servo motor 36.

The electrical air blower 37 blowing air toward a compartment is provided downstream of the inside-outside air switching box 32. The air blower 37 includes a centrifugal air blower fan 37a driven by a motor 37b. A cooling heat exchanger 12 cooling blowing air is disposed downstream of the air blower 37.

The cooling heat exchanger 12 is one of elements forming a refrigeration cycle device 139 and cools blowing air by letting a refrigerant under low temperature and pressure evaporate with heat absorbed from the blowing air. The refrigeration cycle device 139 is known and formed to circulate the refrigerant from a discharge side of a compressor 140 to the cooling heat exchanger 12 by way of a condenser 141, a liquid receiver 142, and an expansion valve 143 forming a decompression device. Outside air (cooling air) is blown to the condenser 141 by an electrical cooling fan 141a. The cooling fan 141a is driven by a motor 141b.

The compressor 140 of the refrigeration cycle device 139 is driven by a running engine (not shown) via an electromagnetic clutch 140a. Hence, ON and OFF states of the compressor 140 can be controlled by energizing or de-energizing the electromagnetic clutch 140a.

An electrical configuration of the vehicular air conditioner 1 of the present embodiment will now be described.

An air conditioner ECU 26 is an electronic control unit including a known microcomputer having a CPU, a ROM, a RAM, and so on, and peripheral circuits. Computer programs for an air conditioning control are pre-installed in the ROM of the air conditioner ECU 26. Hence, the air conditioner ECU 26 performs various computations and various types of processing by running the pre-installed computer programs.

Detection signals from a group of known air conditioning sensors 100 through 104 and various operation signals from an air conditioning operation panel 110 are inputted into the air conditioner ECU 26.

Specific examples of a group of air conditioning sensors include but not limited to the outside air temperature sensor 100 detecting an outside air temperature (temperature outside a compartment) Tam, the inside air temperature sensor 101 detecting an inside air temperature (temperature inside the compartment) Tr, the solar radiation sensor 102 detecting an amount of incident solar radiation, Ts, in the compartment, the evaporator temperature sensor 103 disposed in an air blowing portion of the cooling heat exchanger 12 and detecting a temperature of evaporator blowing air, Te, the water temperature sensor 104 detecting a temperature of hot water (engine coolant), Tw, flowing into a heating heat exchanger 13, and a vibration sensor 105 (detector) detecting a vibration (that is, noise) of the motor 37b of the air blower 37.

The vibration sensor 105 is provided in the present embodiment on an assumption that the motor 37b of the air blower 37 is one of causes of noise which is generated when the air blower 37 is operated to blow a desired amount of blowing air while a desired blow mode is performed. That is, the vibration sensor 105 is provided to detect a vibration level of the motor 37b as a noise level. The vibration sensor 105 is provided to an outer wall of the motor 37b.

The air conditioning operation panel 110 is provided with various air conditioning operation members, such as a temperature setting switch 111 as an example of a temperature setting device used to set a compartment temperature, a blow mode switch 112 used to manually set a blow mode switched from one to another by the rotary door 15, an inside-outside air selector switch 113 used to manually set an inside-outside air suction mode by the inside-outside air switching door 35, an air conditioner switch 114 used to output an operation command signal (ON signal of the electromagnetic clutch 140a) to the compressor 140, an air blower actuation switch 115 used to manually set an air volume of the air blower 37, an automatic switch 116 used to output a command signal to execute an automatic mode, and so on.

Blow modes of the present embodiment include a face mode (FACE), a foot mode (FOOT), a bi-level mode, a foot-defroster mode (F/D), a defroster mode (DEF), and so on.

An electromagnetic clutch 140a of the compressor 140, servo motors 36, 120, 121, 122, and 123 as examples of electrical drive devices of respective devices, the motor 37b of the air blower 37, the motor 141b of the condenser-cooling cooling fan 141a, and so on are connected to an output side of the air conditioner ECU 26. Operations of the foregoing devices are controlled by an output signal of the air conditioner ECU 26.

The servo motor 36 rotary drives the inside-outside air switching door 35. The servo motor 120 rotary drives the air mixing door 14. The servo motor 121 rotary drives the adjusting door 80. The servo motor 122 rotary drives the adjusting door 81. The servo motor 123 rotary drives the rotary door 15.

Figure 18:
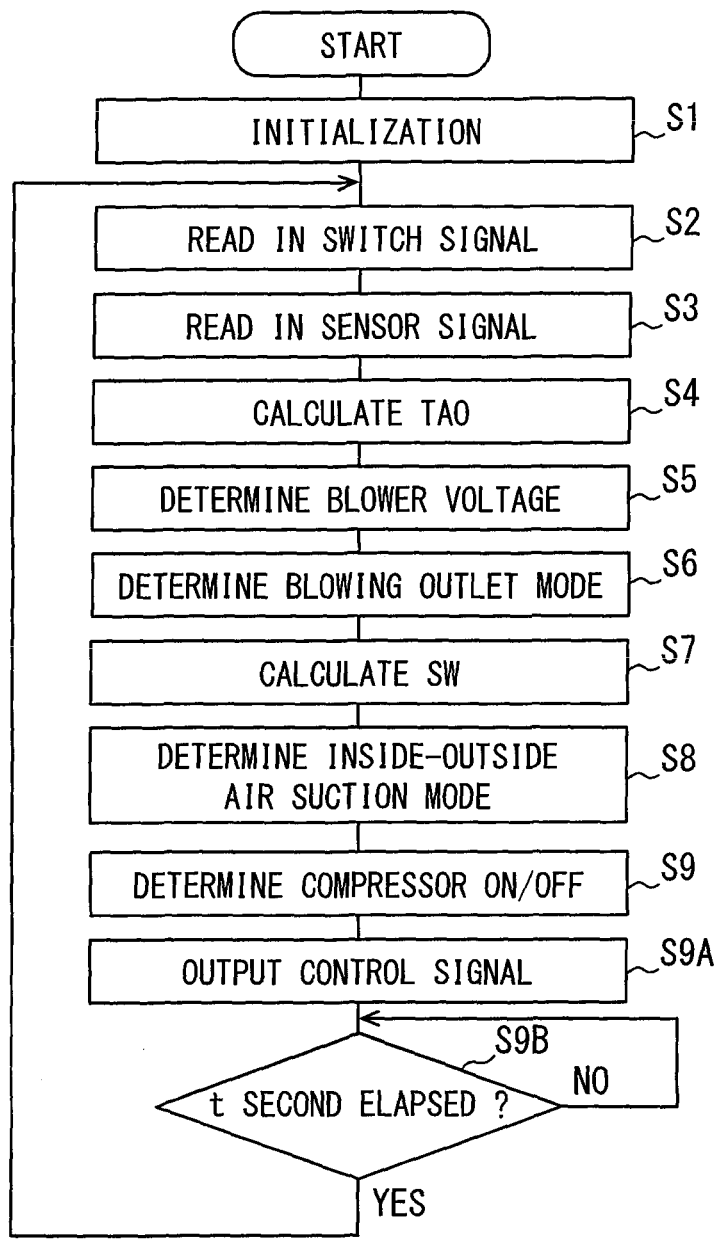
FIG. 18 shows a flowchart depicting air conditioning control processing by an air conditioner ECU in the third embodiment.
Figure 19:
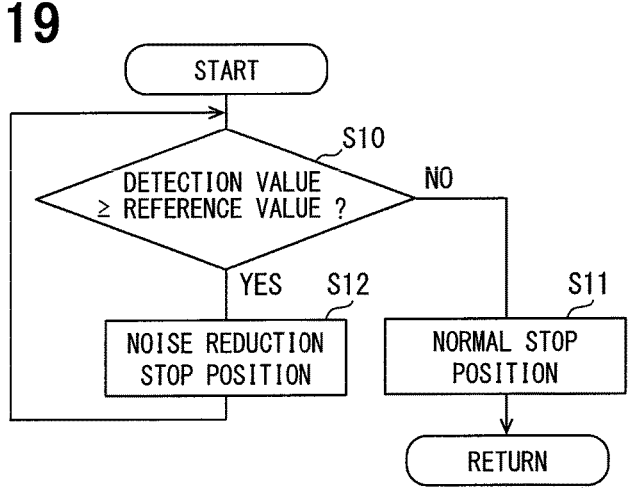
FIG. 19 is a flowchart depicting adjusting door control processing by the air conditioner ECU in the third embodiment.

Air conditioning control processing by the air conditioner ECU 26 of the present embodiment will now be described with reference to FIG. 18 and FIG. 19. FIG. 18 shows a flowchart depicting basic air conditioning control processing by the air conditioner ECU 26. FIG. 19 shows a flowchart depicting adjusting door control processing by the air conditioner ECU 26. The air conditioner ECU 26 performs the air conditioning control processing and the adjusting door control processing in parallel.

The following will describe the air conditioning control processing prior to the adjusting door control processing. Firstly, when an ignition switch is switched ON and DC power is supplied from a battery to the air conditioner ECU 26, a routine of FIG. 18 is started and initialization is executed (Step S1). Subsequently, switch signals are read from the various switches, such as the temperature setting switch 111 (Step S2).

Subsequently, sensor signals converted from analog to digital form are read from the inside air temperature sensor 101, the outside air temperature sensor 100, the solar radiation sensor 102, the evaporator temperature sensor 103, and the water temperature sensor 104 (Step S3).

Subsequently, a target blow temperature TAO of air to be blown into the compartment is calculated in accordance with Equation (1) below pre-stored in the ROM (Step S4).

$$TAO=Kset \times Tset-KR \times TR-KAM \times TAM-KS \times TS+C \quad (1)$$

The target blow temperature TAO is a temperature of air that needs to be blown out from the blowing openings 51b, 51c, and 51d to maintain a compartment temperature at a pre-set temperature Tset.

Herein, Tset is a pre-set temperature set via the temperature setting switch 111, TR is an inside air temperature detected by the inside air temperature sensor 101, TAM is an outside air temperature detected by the outside air temperature sensor 100, TS is an amount of solar radiation detected by the solar radiation sensor 102. In addition, Kset, KR, KAM, and KS are gains and C is a correction constant.

Subsequently, a volume of blowing air the air blower 37 is to flow (hereinafter, referred to as the target volume of blowing air) is determined according to the target blow temperature TAO, an output signal of the air blower actuation switch 115, and an output signal of the automatic switch 116.

In a case where a volume of blowing air from the air blower 37 is manually set by an operation on the air blower actuation switch 115, the manually set volume of blowing air is determined as the target volume of blowing air.

Herein, the manually set volume of blowing air is any one of a low level (blower Lo), a middle level (blower Mi), and a high level (blower Hi).

In a case where the automatic mode is set by an operation on the automatic switch 116, a blower voltage (that is, a voltage applied to the motor 37b of the air blower fan 37a) corresponding to the target blow temperature (TAO) is determined from a characteristic chart pre-stored in a memory (Step S5). The blower voltage determined in the manner as above and a volume of blowing air the air blower 37 is to blow are in a one-to-one correspondence. Hence, the target volume of blowing air is determined according to the target blow temperature (TAO) in the automatic mode. A part of the air conditioner ECU 26 performing a control operation in Step S5 may be used as an example of a second decider which decides a volume of blowing air the air blowing unit 20 is to generate.

A volume of blowing air set in the automatic mode is any one a low level (blower Lo), a middle level (blower Mi), and a high level (blower Hi).

Subsequently, a blowing outlet mode is determined according to the target blow temperature TAO and an output signal of the blow mode switch 112 (Step S6). A part of the air conditioner ECU 26 performing a control operation in Step S6 may be used as an example of a first decider which decides one of the blowing openings 51*b*, 51*c*, and 51*d* as a blowing opening from which an airflow is to be blown out.

In a case where the automatic mode is set by a user via the automatic switch 116, the blowing outlet mode to be executed is determined from any one of the face mode, the bi-level mode, and the foot mode according to the target blow temperature TAO with reference to a characteristic chart pre-stored in the memory.

In a case where the blowing outlet mode is set manually by the user via the blow mode switch 112, the manually-set one mode is determined as the blowing outlet mode to be executed.

The blowing outlet mode to be executed is determined according to the manual setting via the blow mode switch 112 and the target blow temperature TAO in the manner as above.

Subsequently, a target door opening degree (SW) of the air mixing door 14 is calculated in accordance with Equation (2) below pre-stored in the ROM (Step S7).

$$SW=\{(TAO-TE)/(TW-TE)\}\times 100(\%) \quad (2)$$

where TE is a post-evaporation temperature detected by the evaporator temperature sensor 103 and a coolant temperature detected by the water temperature sensor 104.

When a calculation result is SW≤0(%), the air mixing door 14 is controlled to stay at a position (MAXCOOL position) at which cold air from the cooling heat exchanger 12 is entirely forced to detour around the heating heat exchanger 13. When the calculation result is SW≥100(%), the air mixing door 14 is controlled to stay at a position (MAXHOT position) at which cold air from the cooling heat exchanger 12 is entirely passed through the heating heat exchanger 13.

When the calculation result is 0(%)<SW<100(%), the air mixing door 14 is controlled to stay at a position at which cold air from the cooling heat exchanger 12 is partly passed through the heating heat exchanger 13 and a rest of the cold air is forced to detour around the heating heat exchanger 13.

Subsequently, an inside-outside air suction mode is determined according to settings via an inside-outside air selector switch 73 on the air conditioning operation panel 110 (Step S8).

Subsequently, an operation condition of the compressor 140 is determined when an air conditioner switch 74 is ON. That is, whether the compressor 140 is turned ON or OFF is determined according to the post-evaporation temperature (TE) detected by the evaporator temperature sensor 103 (Step S9). More specifically, when the post-evaporation temperature (TE) detected by the evaporator temperature sensor 103 is as high as or higher than a first frost formation temperature (for example, 4° C.), the refrigeration cycle device 139 is actuated by controlling (turning ON) energization of the electromagnetic clutch 140*a* to start (turn ON) the compressor 140. In short, the cooling heat exchanger 12 is actuated. When the post-evaporation temperature (TE) detected by the evaporator temperature sensor 103 is as high as or lower than a second frost formation temperature (for example, 3° C.) lower than the first frost formation temperature, the refrigeration cycle device 139 in operation is stopped by controlling (turning OFF) energization of the electromagnetic clutch 140*a* to stop (turn OFF) the compressor 140 in operation. In short, an air cooling function of the cooling heat exchanger 12 is stopped.

Subsequently, control signals are outputted to actuators 14, 22, and 53, the motor 37*b* of the air blower fan 37*a*, and the electromagnetic clutch 140*a* to obtain the respective control conditions calculated or determined in Steps S5, S6, S7, and S9 (Step S9A). A part of the air conditioner EUC 26 performing a control operation in Step S9A may be used as an example of a first controller which controls the rotary door 15 to allow one (second door opening) of multiple door openings 64, 65, and 66 to communicate with one (first blowing opening) of multiple blowing openings 51*b*, 51*c*, and 51*d*. Alternatively, the part of the air conditioner EUC 26 performing the control operation in Step S9A may be used as an example of a second controller which controls the air blowing unit 20 to blow a predetermined volume of blowing air.

In Step S9B, a determination is made as to whether a time elapsed after read processing in Step S2 has started (hereinafter, referred to as the elapsed time) reaches or exceeds a control cycle time t (for example, 0.5 seconds to 2.5 seconds).

When the elapsed time is less than the control cycle time t, a negative determination (NO) is made in Step S9B and the flow returns to Step S9B. Hence, a negative determination is repetitively made in Step S9B as long as the elapsed time is less than the control cycle time t. When the elapsed time reaches or exceeds the control cycle time t, a positive determination (YES) is made in Step S9B and the flow returns to S2 to repeat processing operations in respective Steps S2, S3, S4, S5, S6, S7, S8, S9, S9A, and S9B.

The adjusting door control processing will now be described. Firstly, whether a detection value detected by the vibration sensor 105 is equal to or larger than a reference value is determined (Step S10). When the detection value detected by the vibration sensor 105 is less than the reference value, a negative determination (NO) is made. In response to the negative determination, the adjusting doors 80 and 81 are stopped at normal stop positions by controlling the servo motors 121 and 122, respectively (Step S11). When the detection value detected by the vibration sensor 105 is equal to or larger than the reference value, a positive determination (YES) is made. In response to the positive determination, the adjusting doors 80 and 81 are stopped at noise reduction stop positions by controlling the servo motors 121 and 122, respectively (Step S12). A part of the air conditioner ECU 26 performing a control operation in Step S12 may be used as an example of a third controller which controls the adjusting doors 80 and 81.

The normal stop positions and the noise reduction stop positions of the adjusting doors 80 and 81 of the present embodiment will now be described.

The normal stop positions of the adjusting doors 80 and 81 in the face mode are shown in FIG. 15. That is, the adjusting door 80 at the normal stop position stays on the inner side of the outer peripheral portion 61 in the direction of the radius. The adjusting door 81 at the normal stop position stays on the inner side of the outer peripheral portion 63 in the direction of the radius.

Figure 20:
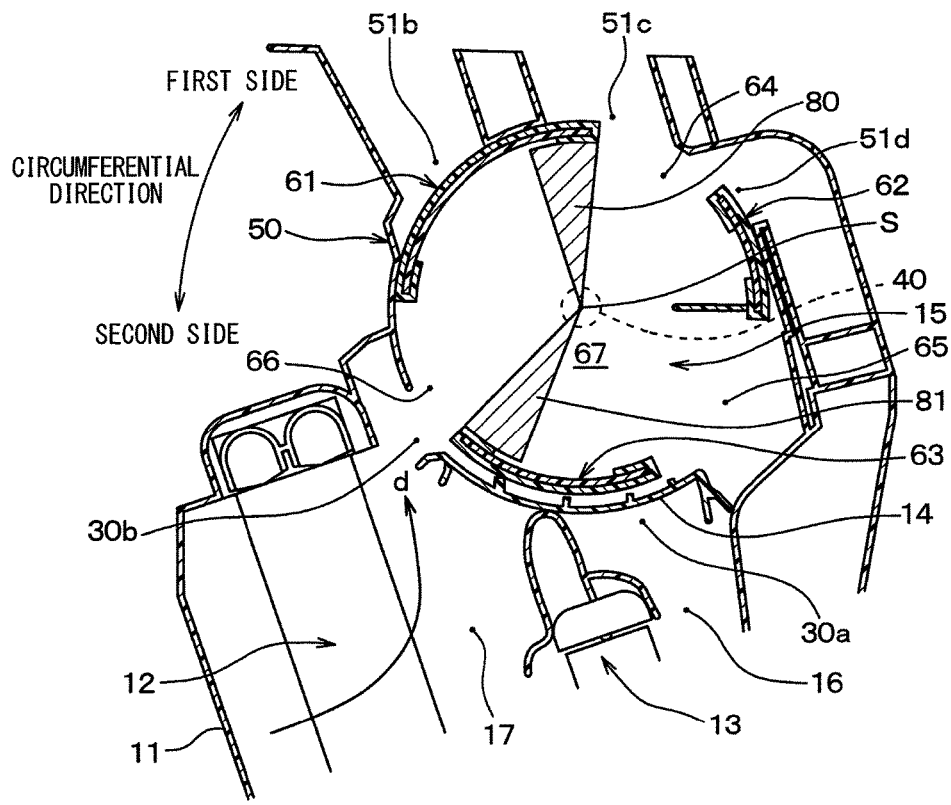
FIG. 20 is a view showing a normal position of adjusting doors in a bi-level mode in the third embodiment.
Figure 21:
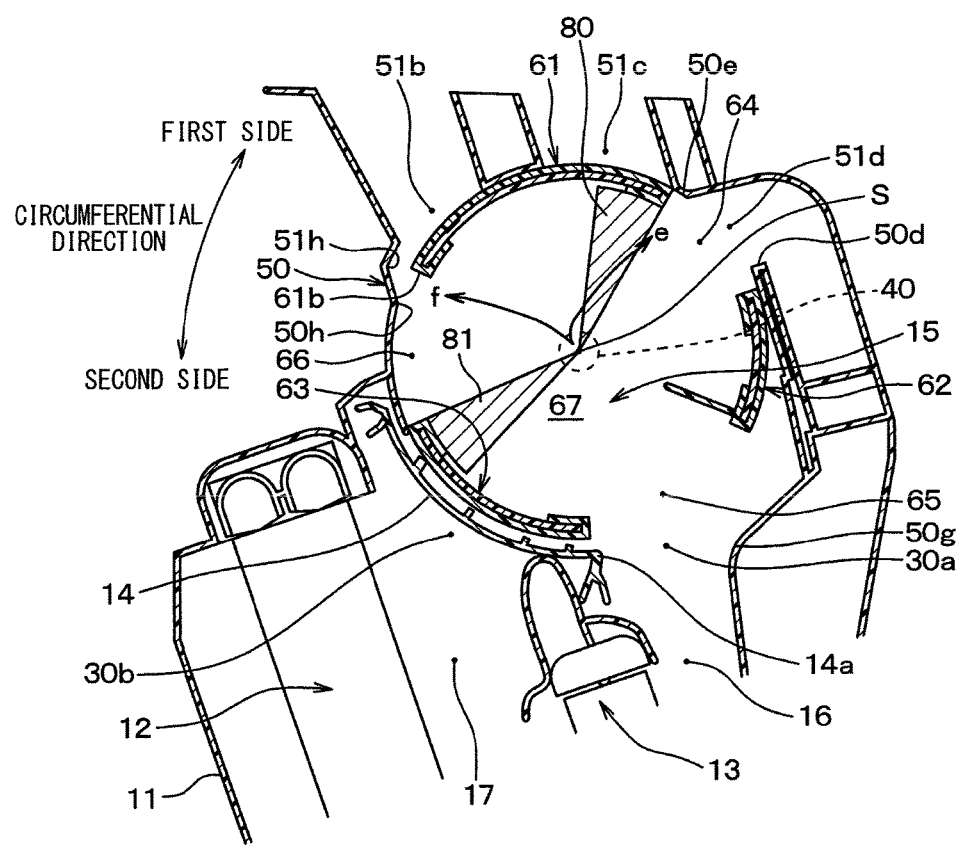
FIG. 21 is a view showing a normal position of the adjusting doors in a foot mode in the third embodiment.

The normal stop positions of the adjusting doors 80 and 81 in the bi-level mode are shown in FIG. 20. That is, the adjusting door 80 at the normal stop position stays on the inner side of the outer peripheral portion 61 in the direction of the radius. The adjusting door 81 at the normal stop position stays on the inner side of the outer peripheral portion 63 in the direction of the radius The normal stop positions of the adjusting doors 80 and 81 in the foot mode are shown in FIG. 21. That is, the adjusting door 80 at the normal stop position stays on the inner side of the outer peripheral portion 61 in the direction of the radius. The adjusting door 81 at the normal stop position stays on the inner side of the outer peripheral portion 63 in the direction of the radius.

Figure 22:
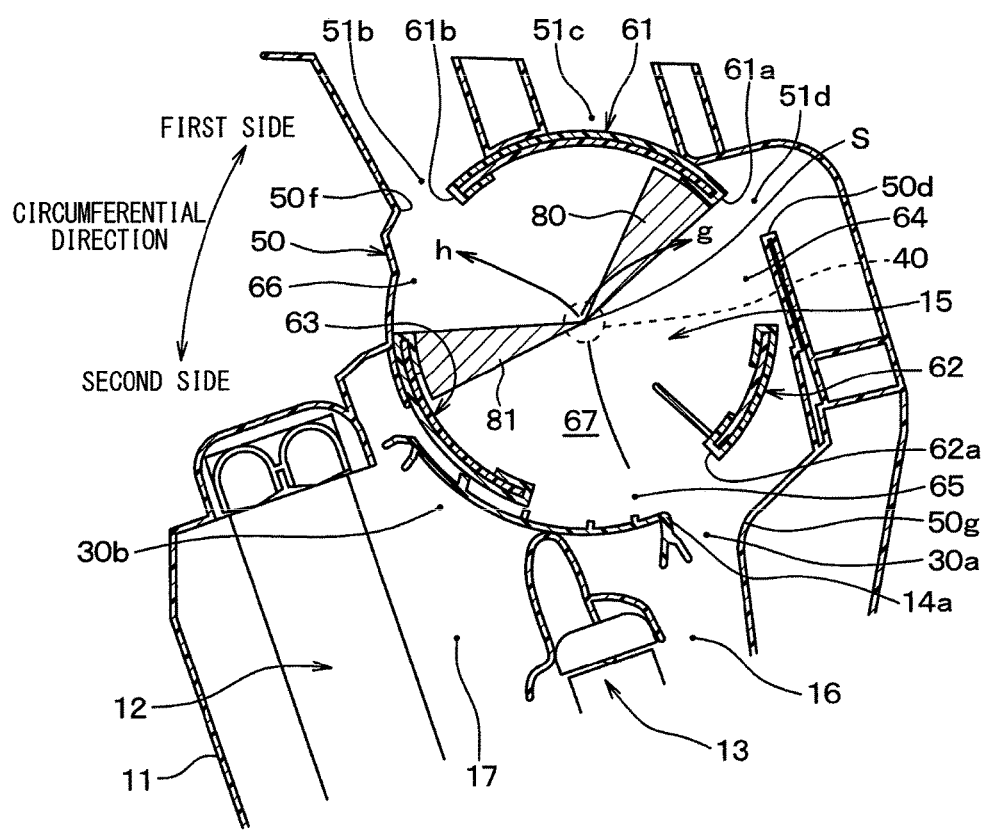
FIG. 22 is a view showing a normal position of the adjusting doors in a foot-defroster mode in the third embodiment.

The normal stop positions of the adjusting doors 80 and 81 in the foot-defroster mode are shown in FIG. 22. That is, the adjusting door 80 at the normal stop position stays on the inner side of the outer peripheral portion 61 in the direction of the radius. The adjusting door 81 at the normal stop position stays on the inner side of the outer peripheral portion 63 in the direction of the radius.

Figure 23:
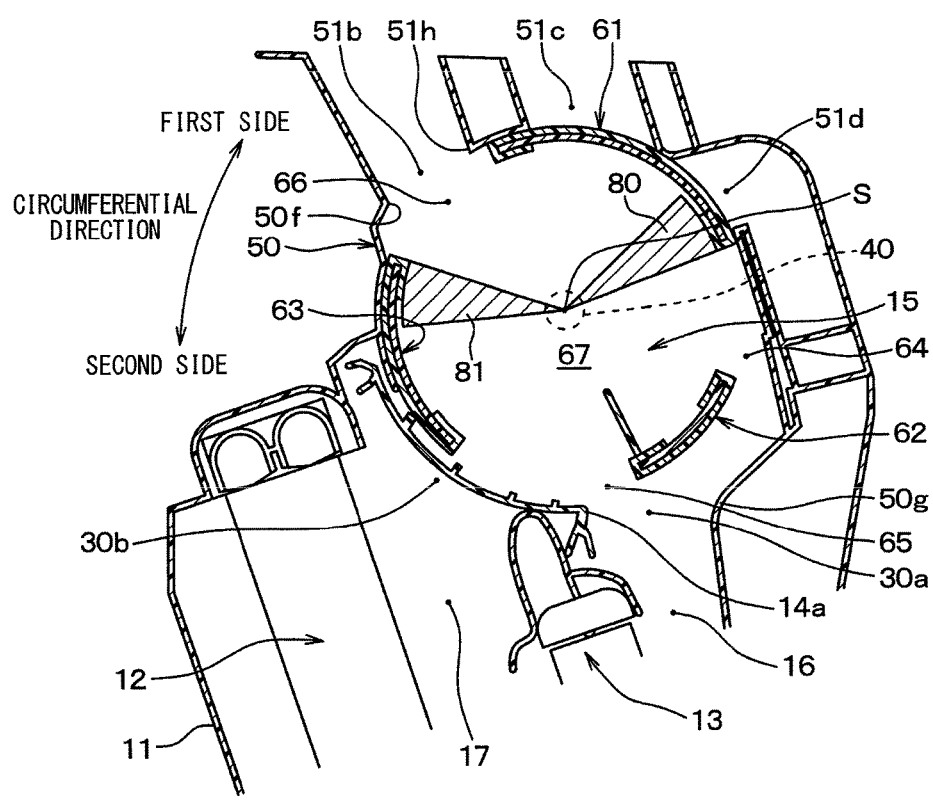
FIG. 23 is a view showing a normal position of the adjusting doors in a defroster mode in the third embodiment.

The normal stop positions of the adjusting doors 80 and 81 in the defroster mode are shown in FIG. 23. That is, the adjusting door 80 at the normal stop position stays on the inner side of the outer peripheral portion 61 in the direction of the radius. The adjusting door 81 at the normal stop position stays on the inner side of the outer peripheral portion 63 in the direction of the radius.

In the manner as above, the adjusting doors 80 and 81 do not change areas A1, A2, A3, and A4 and areas B1, B2, B3, and B4.

In the present embodiment, it is assumed that the adjusting doors 80 and 81 are at the noise reduction stop positions in the face mode, the foot mode, and the defroster mode.

Figure 24:
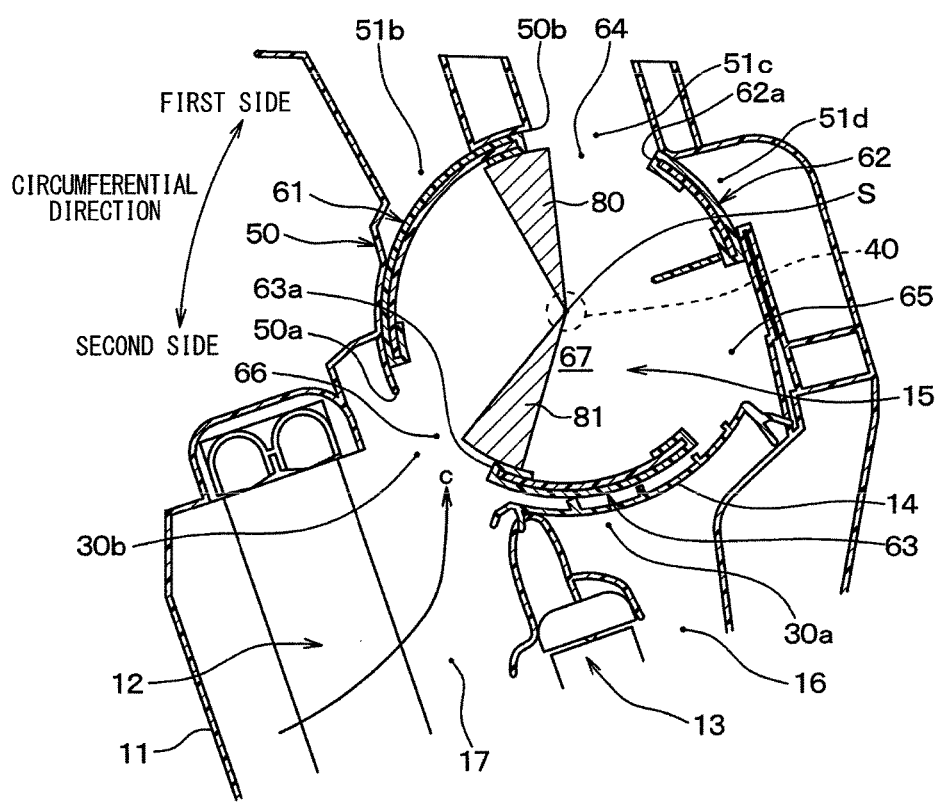
FIG. 24 is a view showing noise reduction stop positions of the adjusting doors in a face mode in the third embodiment.

The noise reduction stop positions of the adjusting doors 80 and 81 in the face mode are shown in FIG. 24.

At the noise reduction stop position of FIG. 24, the outer peripheral portion 80c of the adjusting door 80 slightly closes the face blowing opening 51c. At the noise reduction stop position of FIG. 24, the outer peripheral portion 80c of the adjusting door 81 slightly closes an inlet opening 30b.

The inlet opening 30b and the door opening 66 communicate with each other, and a cross-sectional area of a flow path through which an airflow passes through the inlet opening 30b and the door opening 66 is defined as an area A1. The face blowing opening 51c and the door opening 64 communicate with each other, and a cross-sectional area of a flow path through which an airflow passes through the face blowing opening 51c and the door opening 64 is defined as an area B1.

Then, the area A1 and the area B1 become closer to each other when the adjusting doors 80 and 81 stop at the noise reduction stop positions than when the adjusting doors 80 and 81 stop at the normal stop positions.

In the present embodiment, the area A1 and the area B1 are not necessarily equal to each other to reduce noise, and the area A1 and the area B1 may be different from each other on a condition that noise is reduced to an extent that a feeling of strangeness is not given to an occupant.

Figure 25:
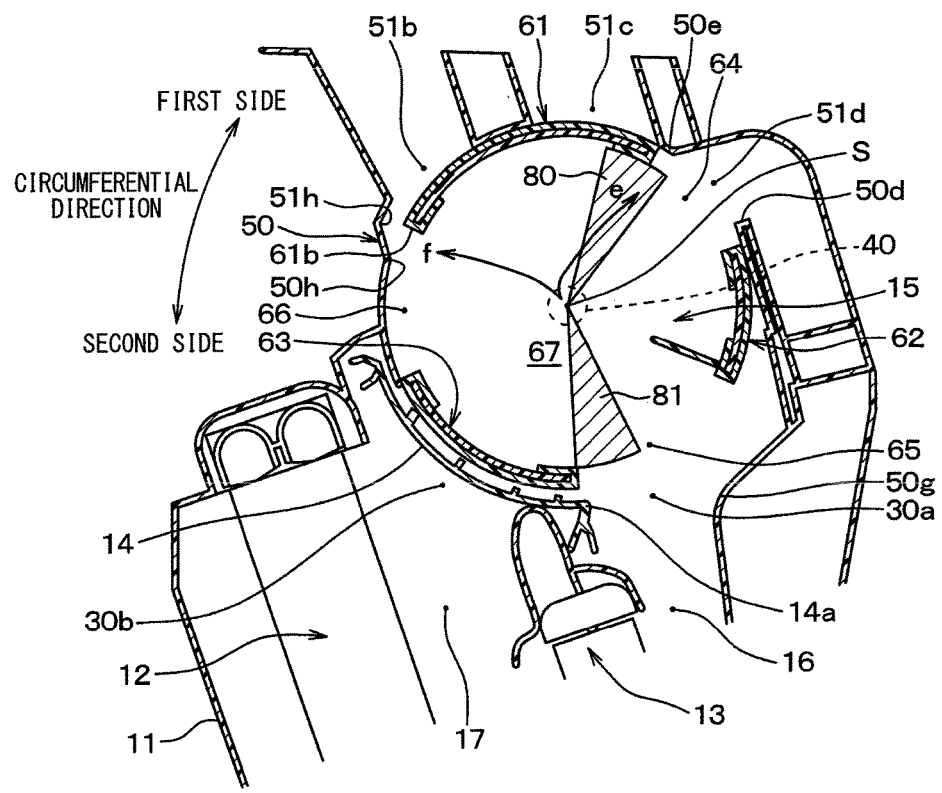
FIG. 25 is a view showing noise reduction stop positions of the adjusting doors in the foot mode in the third embodiment.

The noise reduction stop positions of the adjusting doors 80 and 81 in the foot mode are shown in FIG. 25. At the noise reduction stop position of FIG. 25, the outer peripheral portion 80c of the adjusting door 80 slightly closes a foot blowing opening 51d. At the noise reduction stop position of FIG. 25, the adjusting door 81 slightly closes an inlet opening 30a.

A cross-sectional area of a flow path through which an air flow passes through the inlet opening 30a and the door opening 65 is defined as an area A2, and a cross-sectional area of a flow path through which an airflow passes through the foot blowing opening 51d and the door opening 64 is defined as an area B2.

Then, the area A2 and the area B2 become closer to each other when the adjusting doors 80 and 81 are at the noise reduction stop positions than when the adjusting doors 80 and 81 are at the normal stop positions.

In the present embodiment, the area A2 and the area B2 are not necessarily equal to each other to reduce noise, and the area A2 and the area B2 may be different from each other on a condition that noise is reduced to an extent that a feeling of strangeness is not given to an occupant.

Figure 26:
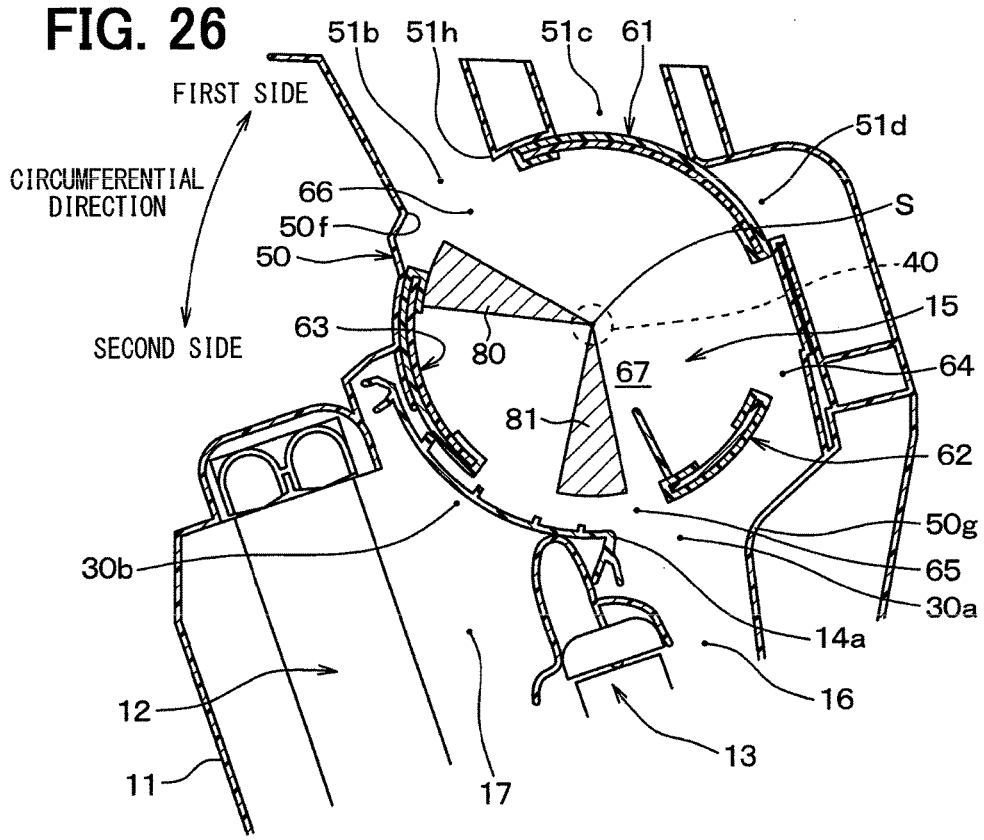
FIG. 26 is a view showing noise reduction stop positions of the adjusting doors in the defroster mode in the third embodiment.

The noise reduction stop positions of the adjusting doors 80 and 81 in the defroster mode are shown in FIG. 26. At the noise reduction stop position of FIG. 26, the outer peripheral portion 80c of the adjusting door 80 slightly closes the defroster blowing opening 51b. At the noise reduction stop position of FIG. 26, the outer peripheral portion 80c of the adjusting door 81 slightly closes the inlet opening 30a.

The inlet opening 30a and the respective door openings 65 and 64 communicate with each other, and a cross-sectional area of a flow path through which an airflow passes through the inlet opening 30a and both the door openings 65 and 64 is defined as an area A4. The defroster blowing opening 51b and the door opening 66 communicate with each other, and a cross-sectional area through which an airflow passes through the defroster blowing opening 51b and the door opening 66 is defined as an area B4.

Then, the area A4 and the area B4 become closer to each other when the adjusting doors 80 and 81 are at the noise reduction stop positions than when the adjusting doors 80 and 81 are at the normal stop positions.

In the present embodiment, the area A4 and the area B4 are not necessarily equal to each other to reduce noise, and the area A4 and the area B4 may be different from each other on a condition that noise is reduced to an extent that a feeling of strangeness is not given to an occupant.

In the present embodiment, a volume of air reduced by moving the adjusting doors 80 and 81 to the noise reduction stop positions in the face mode, the foot mode, and the defroster mode is preferably set to a small value so as not to give a feeling of strangeness to an occupant.

In the foot mode, the defroster mode, and the foot-defroster mode, the air mixing door 14 is set to a maximum warm mode (Maxwarm mood) to fully open the inlet opening 30a and fully close the inlet opening 30b. In the face mode, the air mixing door 14 is set to a maximum cool mode (Maxcool mood) to fully close the inlet opening 30a and fully open the inlet opening 30b. In the bi-level mode, the air mixing door 14 is set to an intermediate mode to open both of the inlet openings 30a and 30b.

According to the present embodiment described above, the air conditioner EUC 26 executes one of the multiple blow modes and controls the air blower 37 to blow a target volume of blowing air, and when a noise level is determined to be at or above the threshold value according to a detection value of the vibration sensor 105, the adjusting doors 80 and 81 are stopped at the noise reduction stop positions by controlling the servo motors 121 and 122, respectively. Accordingly, in the face mode, for example, a difference between the area A1 and the area B1 becomes smaller and the area A1 and the area B1 become closer to each other. Likewise, a difference between the area A2 and the area B2 in the foot mode becomes smaller and the area A2 and the area B2 become closer to each other, and a difference between the area A4 and the area B4 in the defroster mode becomes smaller and the area A4 and the area B4 become closer to each other. A noise level can be thus lowered.

Figure 27:
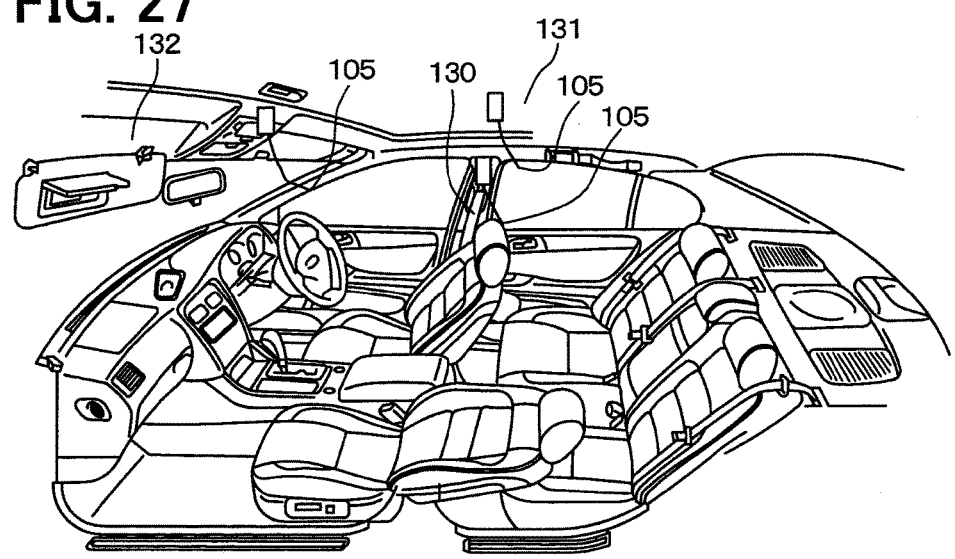
FIG. 27 is a view showing a location of a noise sensor in a modification of the third embodiment.

The third embodiment has described a case where the vibration sensor 105 is provided to the motor 37b of the air blower 37. However, as is shown in FIG. 27, a sensor detecting a noise level may be provided to a portion other than the air blower 37 in the air conditioning unit 10. Alternatively, a sensor detecting a noise level may be provided in the compartment. For example, the vibration sensor 105 may be provided to an A-pillar 130, a ceiling 131, or a front windshield 132 in the compartment.

Fourth Embodiment

The third embodiment above has described a case where the adjusting doors 80 and 81 are adjusted by controlling the servo motors 121 and 122, respectively, when a detection value of the vibration sensor 105 is equal to or larger than the reference value. The present embodiment will describe a case where adjusting doors 80 and 81 are adjusted by controlling servo motors 121 and 122, respectively, when an estimated value of a noise level is determined to be equal to or larger than a reference value before an air blower 37 and a rotary door 15 are controlled.

Figures 28, 29:
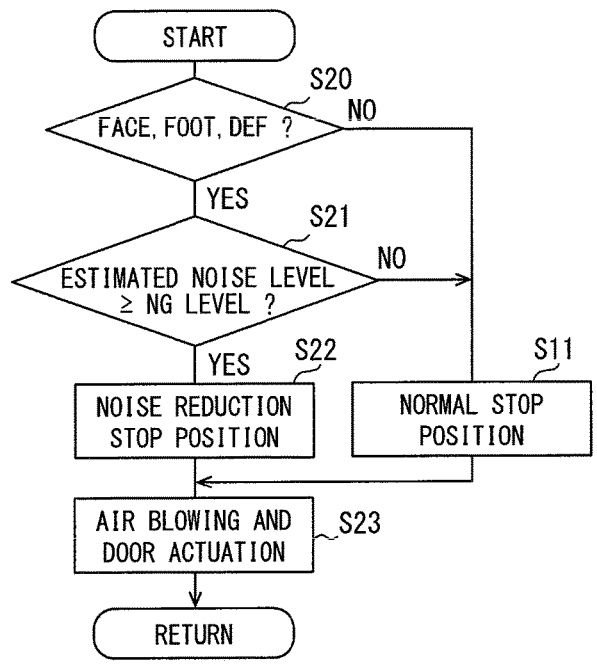
FIG. 28 shows a flowchart depicting adjusting door control processing by an air conditioner EUC according to a fourth embodiment of the present disclosure.
FIG. 29 is a view specifying a relation among a blowing outlet mode, a volume of blowing air, and a noise NG level in the fourth embodiment.

FIG. 28 shows a flowchart depicting adjusting door control processing by an air conditioner ECU 26 of the present embodiment. The flowchart of the adjusting door control processing of the present embodiment depicts a part of the processing in Step S9A of FIG. 18 in detail.

The air conditioner ECU 26 performs the adjusting door control processing in accordance with the flowchart of FIG. 28 instead of the flowchart of FIG. 19.

The air conditioner EUC 26 performs the adjusting door control processing after a volume of blowing air is determined in Step S5 and the blowing outlet mode is determined in Step S6 and before the air blower 37 and the rotary door 15 are controlled.

Firstly, a determination is made as to whether the blowing outlet mode determined in Step S6 of FIG. 18 is a blow mode in which a noise level may possibly rise to or above the reference value (threshold value). In the present embodiment, a face mode, a foot mode, and a defroster mode are set as the blow mode in which a noise level may possibly rise to or above the reference value (see FIG. 29).

When the blowing outlet mode determined in Step S6 is a bi-level mode or a foot-defroster mode, it is determined that the blowing outlet mode determined in Step S6 is not the blow mode in which the noise level may possibly rise to or above the reference value. Hence, a negative determination (NO) is made and advancement is made to Step S11, in which the adjusting doors 80 and 81 are located at normal stop positions by controlling the servo motors 121 and 122, respectively. Meanwhile, when the blowing outlet mode determined in Step S6 is any one of the face mode (FACE), the foot mode (FOOT), and the defroster mode (DEF), it is determined that the blowing outlet mode determined in Step S6 is the blow mode in which the noise level may possibly rise to or above the reference value, in which case a positive determination (YES) is made in Step S20.

In the case of a positive determination, a determination is made in Step S21 as to whether a noise level (hereinafter, referred to as the estimated noise level) estimated when the blowing outlet mode determined in Step S6 is performed and the air blower 37 is controlled to blow a volume of blowing air determined in Step S5 is a noise NG level. The noise NG level means that the noise level is at or above the reference value. A part of the air conditioner EUC 26 performing control operations in Steps S20 and S21 may be used as an example of a determiner which determines whether the estimated noise level is at or above a predetermined value.

In the present embodiment, as is set forth in FIG. 29, when a volume of blowing air in the face mode is at a high level (blower Hi) in a manual mode, the volume of blowing air is set at the noise NG level. When a volume of blowing air in the foot mode is at the high level (blower Hi) in the manual mode, the volume of blowing air is set at the noise NG level. When a volume of blowing air in the defroster mode is at a high level (blower Hi) in an automatic mode, the volume of blowing air is set at the noise NG level. When a volume of blowing air in the defroster mode is at the high level (blower Hi) in the manual mode, the volume of blowing air is set at the noise NG level. FIG. 29 shows a relation that any one of the blowing outlet mode, a volume of blowing air, and the noise NG level can be specified from the other two in a one-to-one correspondence.

When it is determined in Step S21 that the estimated noise level is the noise NG level according to a volume of blowing air determined in Step S5 and the blowing outlet mode determined in Step S6, a positive determination (YES) is made in Step S21, in which case the adjusting doors 80 and 81 are located at the noise reduction stop positions by controlling the servo motors 121 and 122, respectively.

In subsequent Step S23, a motor 37b is controlled for the air blower 37 to blow a volume of blowing air determined in Step S5 and the rotary door 15 is controlled via a servo motor 123 to execute the blowing outlet mode determined in Step S6.

When it is determined in Step S21 that the estimated noise level is below the noise NG level, a negative determination (NO) is made in Step S21, in which case the adjusting doors 80 and 81 are located at the normal stop positions by controlling the servo motors 121 and 122, respectively.

According to the embodiment described above, in a case where the air conditioner ECU 26 determines that an estimated value of a level of noise generated when the blowing outlet mode determined in Step S6 of FIG. 18 is executed and the air blower 37 is controlled to blow the target volume of blowing air determined in Step S5 is equal to or larger than the reference value, the adjusting doors 80 and 81 are located at the noise reduction stop positions by controlling the servo motors 121 and 122, respectively, before the air blower 37 and the rotary door 15 are controlled. Accordingly, a difference between an area A1 (A2 or A3) and an area B1 (B2 or B3) becomes smaller. Hence, generation of noise at a level at or above the reference value can be forestalled.

The first embodiment above has described a case where the area A1 which is a cross-sectional area of a flow path when an airflow passes through an inlet opening 30b and a door opening 66 is equal to the area B1 which is a cross-sectional area of a flow path when an airflow passes through a face blowing opening 51c and a door opening 64 in the face mode. However, configurations as follows may be adopted as well.

That is, let an area A1a be a cross-sectional area of a flow path when an airflow passes through the inlet opening 30b and the door opening 66, and an area A1b be a cross-sectional area of a flow path when an airflow passes through the inlet opening 30a and a door opening 65. Further, let an area A1 (=A1a+A1b) be a sum of the area A1a and the area A1b. Then, the area A1 and the area B1 may be equal to each other.

Alternatively, let an area B5a be a cross-sectional area of a flow path when an airflow passes through the face blowing opening 51c and the door opening 64, and area B5b be a cross-sectional area of a flow path when an airflow passes through a foot blowing opening 51d and the door opening 64 in the bi-level mode. Further, let an area B5 be a sum of the area B5a and the area B5b. Then, the area B5 and the area A1 (=A1a+A1b) may be equal to each other.

The first embodiment above has described a case where the area A2 which is a cross-sectional area of a flow path when an airflow passes through an inlet opening 30a and the door opening 65 is equal to the area B2b which is a cross-sectional area of a flow path when an airflow passes through the foot blowing opening 51d and the door opening 64 in the foot mode. However, configurations as follows may be adopted as well.

A cross-sectional area of a flow path through which an airflow passes through the inlet opening 30a and the door opening 65 is defined as an area A2a. A cross-sectional area of a flow path through which an airflow passes through the inlet opening 30b and the door opening 66 is defined as an area A2b. When a sum of the area A2a and the area A2b is defined as an area A2 (=A2a+A2b), the area A2 and the area B2 may be equal to each other.

Likewise, the area A2 (=A2a+A2b) and the area B3 (=B3a+B3b) in the foot-defroster mode may be equal to each other.

Alternatively, let an area A4a be a cross-sectional area of a flow path when an airflow passes through the inlet opening 30a and both of the door openings 64 and 65, and an area A4b be a cross-sectional area of a flow path when an airflow passes through the inlet opening 30b and the door opening 66. Further, let an area A4 (=A4a+A4b) be a sum of the area A4a and the area A4b. Then, the area A4 and the area B4 may be equal to each other.

The first, second, third, and fourth embodiments above have described a case where the air conditioner of the present disclosure is a vehicular air conditioner. However, the air conditioner of the present disclosure may be an air conditioner (for example, a stationary air conditioner) other than a vehicular air conditioner or an air conditioner equipped to various types of moving vehicles.

The first, second, third, and fourth embodiments above have described a case where the rotary door 15 includes three outer peripheral portions (61, 62, and 63). However, the rotary door 15 may include two or four outer peripheral portions instead.

The second embodiment above has described a case where the rotary door 15 is provided with the sound deadening materials 70a, 70b, and 70c. However, a noise reflection plate reflecting noise may be additionally provided to the rotary door 15. By combining the sound deadening materials 70a, 70b, and 70c and the noise reflection plate, noise at more than one frequency can be attenuated.

The first, second, third, and fourth embodiments above have described a case where the rotary door 15 forms the mode switching door which switches the blow modes. However, the rotary door 15 may also form doors other than the mode switching door, such as an inside-outside air switching door and an air mixing door.

When the present disclosure is implemented, a sound deadening material and a noise reflection plate may be provided to the air mixing door 14 on the inner side in the direction of the radius in the first, second, third, and fourth embodiments.

The third and fourth embodiments have described a case where two adjusting doors (80 and 81) are provided. However, only one adjusting door (80 or 81) may be provided instead.

Alternatively, adjusting doors may be provided separately to a defroster blowing opening 51b, the face blowing opening 51c, and the foot blowing opening 51d. In short, an adjusting door may be provided to each blowing opening.

Figure 30:
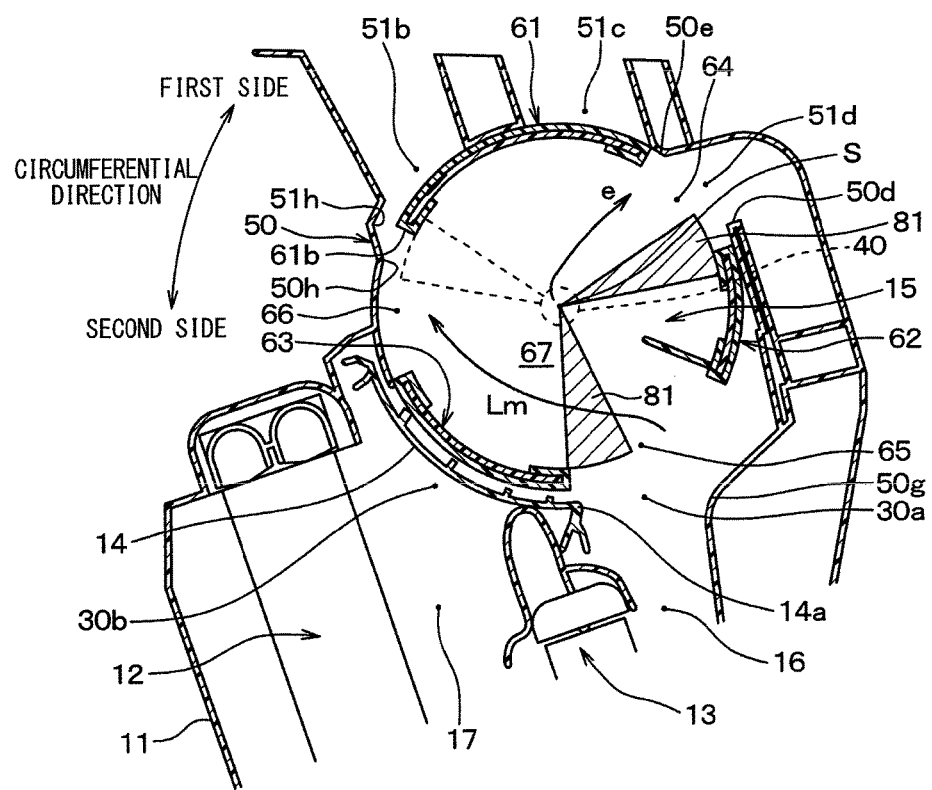
FIG. 30 is a view showing a normal position of the adjusting doors in a modification of the third and fourth embodiments.

The third and fourth embodiments above have described a case where a noise level is lowered by making the area A1 (A2 or A3) and the area B1 (B2 or B3) closer to each other by using the adjusting doors 80 and 81. However, a configuration as shown in FIG. 30 may be additionally adopted.

That is, the adjusting door 80 (or 81) is disposed at a position indicated by a dotted line when an air flow path is formed between the door opening 66 and the defroster blowing opening 51b. When configured in the manner as above, a cross-sectional area of the air flow path formed between the door opening 66 and the defroster blowing opening 51b can be reduced. Consequently, air is allowed to blow out from a fine opening between the door opening 66 and the defroster blowing opening 51b.

Owing to the configuration as above, a velocity of an airflow flowing in the rotary door 15 from a side of the door opening 65 toward the defroster blowing opening 51b as is indicated by an arrow Lm can be reduced. Hence, a level of noise generated due to an airflow can be lowered. In addition, because noise can be reflected on the adjusting door 80 (or 81) in the rotary door 15, transmission of noise from the rotary door 15 to the defroster blowing opening 51b can be prevented.

The third and fourth embodiments above have described a case where the face mode, the foot mode, and the defroster mode are the blow mode in which a noise level rises to or above the reference value. However, blow modes other than the face mode, the foot mode, and the defroster mode may be the blow mode in which a noise level rises to or above the reference value.

It should be appreciated that the present disclosure is not limited to the embodiments described above and can be modified as needed. The respective embodiments above are not independent to one another and can be combined unless a combination is apparently infeasible. It goes without saying that the elements forming the respective embodiments above are not essential unless specified as being essential or deemed as being essential in principle.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An air conditioner, comprising:
an air blower generating an airflow;
a rotary door including: a plurality of outer peripheral portions extending in a circumferential direction centered at a shaft center of a rotation shaft which is rotatable, and being arranged side by side in the circumferential direction; first and second side walls disposed, respectively, on a first side and a second side of the plurality of outer peripheral portions in an axial direction of the rotation shaft; and a plurality of door openings provided between the plurality of outer peripheral portions, the plurality of outer peripheral portions, the first and second side walls, and the plurality of door openings rotating simultaneously in accordance with rotation of the rotation shaft;

an air conditioner case storing the rotary door and including an air flow path where the airflow flows, and a case peripheral wall portion, the case peripheral wall portion including an inlet opening communicating with the air flow path, and a plurality of blowing openings communicating with a compartment, the inlet opening and the plurality of blowing openings being located on an outer side of the rotary door in a radial direction centered at the shaft center;

a door space provided inside the rotary door in the air conditioner case and surrounded by the plurality of outer peripheral portions, the first and second side walls, and the case peripheral wall portion, wherein when a first door opening of the plurality of door openings communicates with the inlet opening, and when a second door opening of the plurality of door openings communicates with a first blowing opening of the plurality of blowing openings, an airflow from the air flow path is blown into the compartment through the inlet opening, the first door opening, the door space, the second door opening, and the first blowing opening;

a first controller controlling the rotary door to allow the second door opening to communicate with the first blowing opening;

a second controller controlling the air blower to blow a predetermined volume of blowing air;

an adjusting door adjusting at least one of a first area and a second area, the first area being defined as a cross-sectional area of a flow path through which the airflow passes from the inlet opening to the first door opening, the second area being defined as a cross-sectional area of a flow path through which the airflow passes from the second door opening to the first blowing opening;

a detector detecting a level of noise generated when the first controller controls the rotary door and when the second controller controls the air blower; and a third controller controlling the adjusting door to reduce a difference between the first area and the second area when a detection value of the detector is determined to be equal or larger than a predetermined value.

2. The air conditioner according to claim 1, wherein the first door opening faces a first outer peripheral portion of the plurality of outer peripheral portions across the shaft center of the rotation shaft.

3. The air conditioner according to claim 2, wherein an inner side of the first outer peripheral portion in the radial direction is formed in an arc shape about the shaft center.

4. The air conditioner according to claim 2, wherein:
when the second door opening and the first blowing opening communicate with each other, a cross-sectional area of a flow path through which the airflow passes from the second door opening to the first blowing opening is defined as a third area, when a third door opening of the plurality of door openings and a second blowing opening of the plurality of blowing openings communicate with each other, a cross-sectional area of a flow path through which the airflow passes from the third door opening to the second blowing opening is defined as a fourth area, and a sum of the third area and the fourth area is equal to the first area.

5. The air conditioner according to claim 4, wherein the second opening and the third door opening are disposed, respectively, on a first side and a second side of the first outer peripheral portion in the circumferential direction.

6. The air conditioner according to claim 2, wherein:
when the second door opening and the first blowing opening communicate with each other, a cross-sectional area of a flow path through which the airflow passes from the second door opening to the first blowing opening is defined as a third area, when a third door opening of the plurality of door openings and a second blowing opening of the plurality of blowing openings communicate with each other, a cross-sectional area of a flow path through which the airflow passes from the third door opening to the second blowing opening is defined as a fourth area, one of the third area and the fourth area is equal to the first area, and the one of the third area and the fourth area is larger than another of the third area and the fourth area.

7. The air conditioner according to claim 1, wherein the second door opening is positioned on a line normal to an opening cross section of the first door opening.

8. The air conditioner according to claim 1, further comprising
a sound deadening material reducing pulsation of the airflow and being disposed on an inner side of at least one of the plurality of outer peripheral portions in the radial direction.

9. The air conditioner according to claim 1, wherein the air flow path has a hot air passage where hot air flows and a cold air passage where cold air flows, and the inlet opening includes a first inlet opening which communicates with the hot air passage, and a second inlet opening which communicates with the cold air passage, the air conditioner further comprising an air mixing door being rotatable about the shaft center and rotating to adjust an opening area of the first inlet opening and an opening area of the second inlet opening, wherein the first area is adjusted by the air mixing door.

10. An air conditioner, comprising:
an air blower generating an airflow;
a rotary door including: a plurality of outer peripheral portions extending in a circumferential direction centered at a shaft center of a rotation shaft which is rotatable, and being arranged side by side in the circumferential direction; first and second side walls disposed, respectively, on a first side and a second side of the plurality of outer peripheral portions in an axial direction of the rotation shaft; and a plurality of door openings provided between the plurality of outer peripheral portions, the plurality of outer peripheral portions, the first and second side walls, and the plurality of door openings rotating simultaneously in accordance with rotation of the rotation shaft;

an air conditioner case storing the rotary door and including an air flow path where the airflow flows, and a case peripheral wall portion, the case peripheral wall portion including an inlet opening communicating with the air flow path, and a plurality of blowing openings communicating with a compartment, the inlet opening and the plurality of blowing openings being located on an outer side of the rotary door in a radial direction centered at the shaft center;

a door space provided inside the rotary door in the air conditioner case and surrounded by the plurality of outer peripheral portions, the first and second side walls, and the case peripheral wall portion, wherein when a first door opening of the plurality of door openings communicates with the inlet opening, and when a second door opening of the plurality of door openings communicates with a first blowing opening of the plurality of blowing openings, an airflow from the air flow path is blown into the compartment through the inlet opening, the first door opening, the door space, the second door opening, and the first blowing opening;

a first decider deciding one of the plurality of blowing openings as the first blowing opening from which the airflow is blown out;

a second decider deciding a volume of blowing air to be generated by the air blower;

a first controller controlling the rotary door to allow the second door opening to communicate with the first blowing opening decided by the first decider;

a second controller controlling the air blower to blow the volume of blowing air decided by the second decider;

a determiner determining whether a noise level estimated according to the volume of blowing air decided by the second decider and the first blowing opening decided by the first decider is at or above a predetermined value, before the controls are performed by the first controller and the second controller;

an adjusting door adjusting at least one of a first area and a second area, the first area being defined as a cross-sectional area of a flow path through which the airflow passes from the inlet opening to the first door opening, the second area being defined as a cross-sectional area of a flow path through which the airflow passes from the second door opening to the first blowing opening; and a third controller controlling the adjusting door to reduce a difference between the first area and the second area at the time of the controls performed by the first controller and the second controller, when the determiner determines that the noise level estimated is at or above the predetermined value.

11. An air conditioner, comprising:

a rotary door including: a plurality of outer peripheral portions extending in a circumferential direction centered at a shaft center of a rotation shaft which is rotatable, and being arranged side by side in the circumferential direction; first and second side walls disposed, respectively on a first side and a second side of the plurality of outer peripheral portions in an axial direction of the rotation shaft; and a plurality of door openings provided between the plurality of outer peripheral portions, the plurality of outer peripheral portions, the first and second side walls, and the plurality of door openings rotating simultaneously in accordance with rotation of the rotation shaft;

an air conditioner case storing the rotary door and including an air flow path where an airflow flows, and a case peripheral wall portion, the case peripheral wall portion including an inlet opening communicating with the air flow path, and a plurality of blowing openings communicating with a compartment, the inlet opening and the plurality of blowing openings being located on an outer side of the rotary door in a radial direction centered at the shaft center; and a door space provided inside the rotary door in the air conditioner case and surrounded by the plurality of outer peripheral portions, the first and second side walls, and the case peripheral wall portion, wherein when a first door opening of the plurality of door openings communicates with the inlet opening, and when a second door opening of the plurality of door openings communicates with a first blowing opening of the plurality of blowing openings, an airflow from the air flow path is blown into the compartment through the inlet opening, the first door opening, the door space, the second door opening, and the first blowing opening, and a cross-sectional area of a flow path through which the airflow passes from the inlet opening to the first door opening is defined as a first area, a cross-sectional area of a flow path through which the airflow passes from the second opening to the first blowing opening is defined as a second area, and the first area and the second area are equal to each other.

* * * * *